(12) United States Patent
Margulis et al.

(10) Patent No.: US 9,262,710 B2
(45) Date of Patent: Feb. 16, 2016

(54) PRODUCT IDENTIFICATION TAG AND ASSOCIATED METHODS

(71) Applicants: Norberto J. Margulis, Aventura, FL (US); Alicia G. Margulis, Aventura, FL (US)

(72) Inventors: Norberto J. Margulis, Aventura, FL (US); Alicia G. Margulis, Aventura, FL (US)

(73) Assignee: Etiflex Corporation, Hallandale Beach, FL (US)

( * ) Notice: Subject to any disclaimer, the term of this patent is extended or adjusted under 35 U.S.C. 154(b) by 0 days.

(21) Appl. No.: 13/668,921

(22) Filed: Nov. 5, 2012

(65) Prior Publication Data

US 2013/0193214 A1  Aug. 1, 2013

Related U.S. Application Data

(63) Continuation-in-part of application No. 13/363,701, filed on Feb. 1, 2012, now abandoned.

(51) Int. Cl.
  *G06K 19/063* (2006.01)
  *G06K 19/02* (2006.01)

(52) U.S. Cl.
  CPC .............. *G06K 19/063* (2013.01); *G06K 19/02* (2013.01)

(58) Field of Classification Search
  CPC .................. G06K 19/063; G06K 19/02; G09F 2003/0279; G09F 3/0295; G09F 3/14; G09F 2003/0254
  USPC ........................................... 235/489; 283/72
  See application file for complete search history.

(56) References Cited

U.S. PATENT DOCUMENTS

| | | | |
|---|---|---|---|
| 2,001,679 A * | 5/1935 | Haughey | 40/306 |
| 4,597,814 A | 7/1986 | Colgate, Jr. | |
| 2004/0161565 A1 | 8/2004 | Dronzek | |
| 2004/0201112 A1 | 10/2004 | Divigalpitiya | |
| 2005/0128086 A1 | 6/2005 | Brown et al. | |
| 2006/0088682 A1 | 4/2006 | Dronzek | |
| 2006/0226235 A1 | 10/2006 | Shepherd | |
| 2007/0126226 A1* | 6/2007 | Kolodzie et al. | 283/72 |
| 2008/0136588 A1 | 6/2008 | Carter et al. | |
| 2008/0292856 A1 | 11/2008 | Garner | |

(Continued)

OTHER PUBLICATIONS

Seton, Seton Fire Extinguisher Inspection Tag, http://web.archive.org/web/20100131071448/http://www.seton.com/fire-extinguisher-inspection-tags-and-punch-pliers-84426.html, Jan. 31, 2010, all pages.*

(Continued)

*Primary Examiner* — Kristy A Haupt
(74) *Attorney, Agent, or Firm* — McCarter & English, LLP

(57) ABSTRACT

Exemplary embodiments are directed to a product identification tag, generally including a durable material that includes indicia thereon corresponding to useful information. The durable material is generally configured to be at least one of pierced and/or punched to capture distinctive identification information for a specific product. The distinctive identification information can be at least one of a serial number, an in-service date, and an inspection date. Exemplary embodiments are also directed to a method of product identification, comprising providing a durable material that includes indicia thereon corresponding to useful information. The exemplary method further includes at least one of piercing and/or punching the durable material to capture distinctive identification information for a specific product and detachably securing the durable material to the specific product.

20 Claims, 41 Drawing Sheets

(56) References Cited

U.S. PATENT DOCUMENTS

2008/0309497 A1    12/2008  Bryant
2009/0004236 A1*   1/2009   Kellerby .................. 424/411
2009/0289107 A1    11/2009  Prentice
2012/0067963 A1    3/2012   Margulis et al.

OTHER PUBLICATIONS

U.S. Appl. No. 13/363,701, filed Feb. 1, 2012.

* cited by examiner

PRODUCT IDENTIFICATION TAG AND ASSOCIATED METHODS

CROSS-REFERENCE TO RELATED APPLICATION

The present application is a continuation-in-part application claiming priority benefit to a co-pending non-provisional patent application entitled "Product Identification Tag and Associated Methods" which was filed on Feb. 1, 2012, and assigned Ser. No. 13/363,701. The entire content of the foregoing non-provisional application is incorporated herein by reference.

TECHNICAL FIELD

The present disclosure relates to product identification tags and associated methods for capturing distinctive identification for a specific product. In particular, the present disclosure relates to durable product identification tags and associated methods for implementation in hazardous conditions.

BACKGROUND

In general, product identification tags are used in a variety of industries to allow users to track inventory and to provide crucial information about the particular item to which the product identification tag is attached. Such information is generally printed directly on the product identification tag. In secure applications, e.g., typical consumer supply chains, the product information can be affected by minimal/acceptable levels of wear and tear. However, over time, the information corresponding to the particular item can tear, rub off or otherwise be rendered unreadable. In addition, typical product identification tags are not intended for utilization in rugged and/or hazardous conditions, e.g., construction zones, industrial transport, or the like, where product information can become unrecognizable at a higher rate than in secure applications. Thus, the product identification tags typically implemented in both secure and hazardous applications are generally impractical and fail to provide the crucial product information necessary to the user.

Further, product identification tags currently used are generally pre-printed with the requisite product information and cannot be adjusted to reflect real-time information in a durable manner. For example, an in-service date for a product may be provided to an existing product identification tag by, e.g., printing and/or writing the in-service date on the tag. However, such markings made in real-time are also subject to wear and tear of secure and/or hazardous applications.

In the patent literature, U.S. Patent Publication No. 2007/0126226 to Kolodzie et al. is directed to a two-part security sticker and associated document retrieval system, wherein the security sticker comprises one or more security features on a backing layer having opposite first and second major sides, the first major side having a transparent or translucent adhesive layer applied at least to a first part thereof and a liner on a side of the adhesive layer remote from the backing layer. The design and operation of the Kolodzie '226 security sticker results in numerous restrictions on use that significantly reduce the utility thereof, including specifically the requirement that information be marked onto the sticker before adherence to a hard surface. Indeed, the Kolodzie '226 security sticker is designed to expressly prevent the addition and/or alteration of information in the field, i.e., once it is adhered to a surface. Moreover, adherence of the Kolodzie security sticker to a surface prevents any further inspection and/or interaction with the rear surface thereof.

Thus, despite efforts to date, a need remains for improved product identification tags fabricated from durable materials for reliably and accurately displaying crucial product information. These and other needs are satisfied by the product identification tag and associated methods of the present disclosure.

SUMMARY

In accordance with embodiments of the present disclosure, exemplary product identification tags are disclosed that generally involve a durable material that includes indicia thereon corresponding to useful information. The exemplary durable material is generally configured to be at least one of pierced and/or punched to capture distinctive identification information for a specific product. The durable material can be fabricated from a flexible and/or rigid material, e.g., a rubber, plasticized PVC, a polymer, a silicone, a thermoplastic compound, and the like, and can be formed by, e.g., open molding (poured and/or cast), injection molding, thermoforming, radio frequency welding ("RF welding"), and the like. The durable material can optionally further be reinforced with fabrics.

The useful information on the exemplary product identification tags can be at least one of, e.g., a serial number, an in-service date, an inspection date, and the like. The distinctive identification information captured can also be at least one of, e.g., a serial number, an in-service date, an inspection date, an inspection history, a certification number, a compliance status, and the like. The durable material is configured to be detachably secured to the specific product with, e.g., stitching, RF welding, a tie, a wire lanyard, a rope, a mechanical fastener, an adhesive, a hook and loop system, and the like, and is further configured to endure hazardous conditions. In some exemplary embodiments, the means of securing the durable material to the specific product can include, e.g., screws, rivets, nails, braids, heat seals, pressure sensitive adhesives (PSAs), solvent adhesives, Velcro™, and the like.

In accordance with further embodiments of the present disclosure, exemplary methods of product identification are disclosed that generally involve providing a durable material that includes indicia thereon corresponding to useful information. The exemplary methods generally include at least one of piercing and/or punching the durable material to capture distinctive identification information for a specific product. Further, the exemplary methods generally include detachably securing the durable material to the specific product. Thus, the disclosed exemplary product identification tags and associated methods allow a more durable, reliable and accurate identification of products in secure and/or hazardous conditions.

As discussed in U.S. application entitled "Apparatus and Process Including Radio Frequency Identification Devices," filed as Ser. No. 13/227,515, radio frequency identification devices ("RFIDs") can be implemented for improved tracking of inventory and/or providing crucial information about a particular item. It should be understood that the exemplary product identification tags discussed herein can be utilized in conjunction with the RFIDs and methods of fabrication as taught by the foregoing application, the contents of which are incorporated herein by reference.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed product identification tags and associated methods, reference is made to the accompanying figures, wherein.

DESCRIPTION OF EXEMPLARY EMBODIMENTS

In accordance with embodiments of the present disclosure, exemplary product identification tags are disclosed that generally involve a tag element fabricated from a durable material that includes indicia thereon corresponding to useful information. The exemplary tag element/durable material is generally configured to be at least one of pierced and/or punched to capture distinctive identification information for a specific product. The tag element can be fabricated from a flexible and/or rigid material, e.g., a rubber, plasticized PVC, a polymer, a silicone, a thermoplastic compound, and the like, and can optionally be formed by, e.g., casting, injection molding, thermoforming, RF welding, and the like. The durable material can optionally further be reinforced with fabrics.

The useful information on the exemplary product identification tags can be at least one of, e.g., a serial number, an in-service date, an inspection date, and the like. The distinctive identification information captured can also be at least one of, e.g., a serial number, an in-service date, an inspection date, and the like. The tag element/durable material is configured to be detachably secured to the specific product and is further configured to endure hazardous conditions.

In accordance with further embodiments of the present disclosure, exemplary methods of product identification are disclosed that generally involve providing a tag element/durable material that includes indicia thereon corresponding to useful information. The exemplary methods generally include at least one of piercing and/or punching the tag element/durable material to capture distinctive identification information for a specific product. Further, the exemplary methods generally include detachably securing the tag element/durable material to the specific product.

Figure 1:
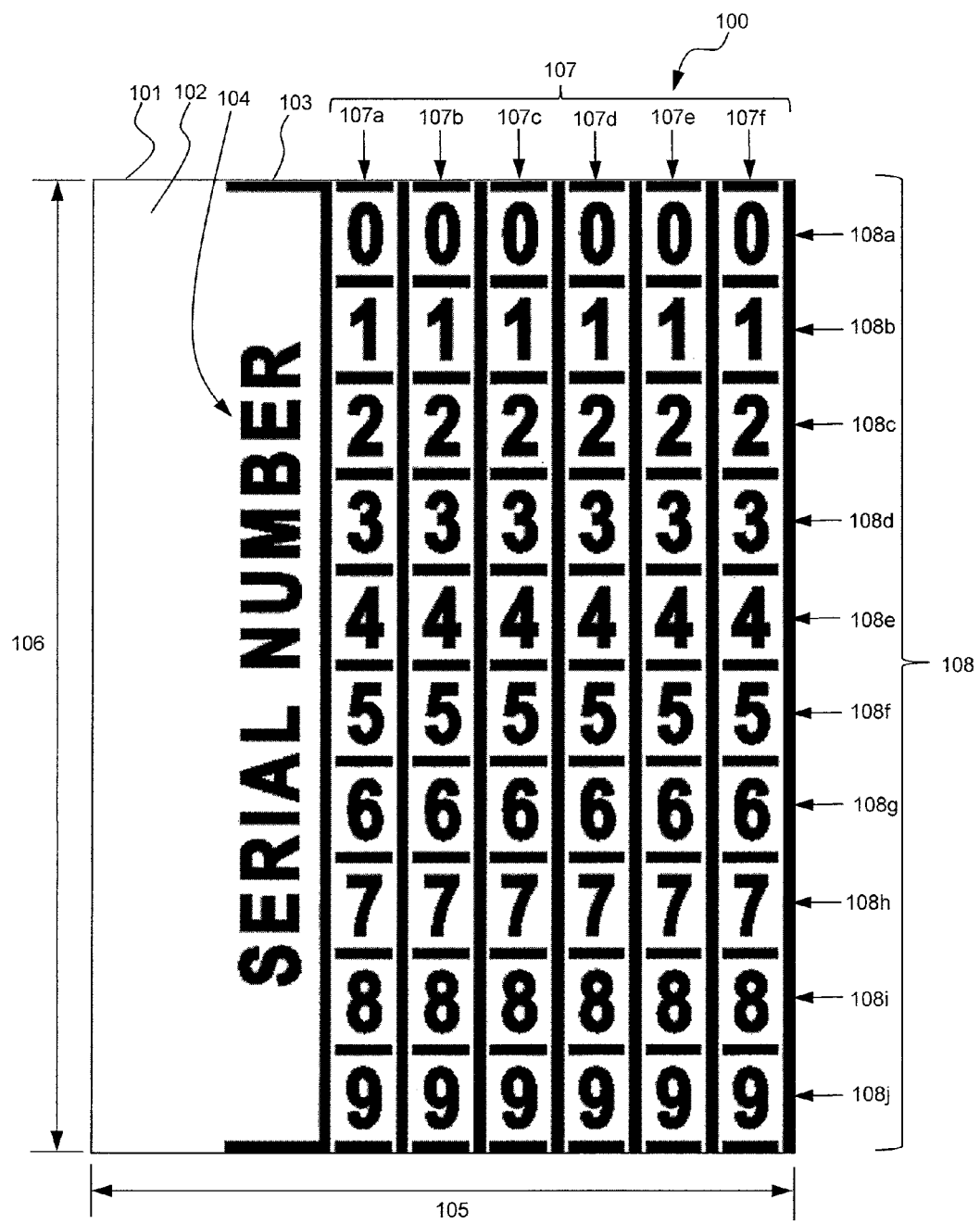
FIG. 1 shows an exemplary product identification tag with a serial number as distinctive identification information.

Turning now to FIG. 1, an exemplary product identification tag 100 is provided. In particular, the exemplary product identification tag 100 includes a tag element/durable material 101 fabricated from a flexible and/or rigid material, e.g., a rubber, plasticized PVC, a polymer, a silicone, a thermoplastic compound, and the like. The tag element/durable material 101 can optionally further be reinforced with fabrics. The product identification tag 100 can include a background surface 102 and indicia 103, illustrated as white and black surfaces, respectively. The background surface 102 and the indicia 103 can be of different colors, e.g., white and black, to permit a user to visually perceive the indicia corresponding to useful information on the product identification tag 100. Further, rather than or in addition to implementing different colors for the background surface 102 and the indicia 103, the indicia 103 can be formed as raised indicia 103. Thus, the indicia 103 can protrude out of the background surface 102 to permit a user to visually and/or physically perceive the indicia corresponding to useful information on the product identification tag 100. The raised indicia 103 can further aid in guiding the tool used to, e.g., pierce, punch out, or the like, the desired indicia 103 located on the tag element/durable material 101. The raised indicia 103 can further provide, e.g., extra durability, abrasion resistance, a wider angle of readability, improved readability in wet, dark and/or hazardous conditions, and the like. In some exemplary embodiments, the indicia 103 can include a textured finish, e.g., a matte finish, and the like. The raised and/or textured indicia 103 can act to prevent a film of water from forming on the product identification tag 100, thus preventing a glare on the product identification tag 100. The indicia 103 can thereby improve the readability of the useful information in wet and/or hazardous conditions.

The exemplary product identification tag 100 of the present disclosure can include indicia 103 corresponding to useful information of a specific product, e.g., a serial number, an in-service date, an inspection date, a date of manufacture, a part number, a traceability code, an expiration date, an ownership code, an alphanumeric code, the location and date/time of manufacture, a recertification date, a rating code (for example, voltage, fire, UL and CE), a country of manufacture, a destination, and the like. In particular, the product identification tag 100 generally includes at least one useful information label 104 for indicating which useful information is being presented. The product identification tag 100 generally further includes a grid of a plurality of columns 107 and a plurality of rows 108 corresponding to the useful information. For example, the exemplary product identification tag 100 depicts indicia 103 corresponding to a serial number, as indicated by the useful information label 104. The product identification tag 100 further depicts indicia 103 for a plurality of rows 108 and columns 107 for capturing the distinctive identification information, e.g., the serial number, for a specific product. Thus, to capture the distinctive serial number for a specific product, a user can, e.g., pierce, punch out, or the like, the tag element/durable material 101.

For example, the plurality of columns 107 can include first to sixth columns 107a to 107f, respectively, and the plurality of rows 108 can include first to tenth rows 108a to 108j, respectively. Although illustrated as six columns 107 and eleven rows 108, it should be understood that the exemplary product identification tag can include greater and/or less columns 107 and/or rows 108 based on the length and/or type of serial number implemented. It should further be understood that the plurality of columns 107 and rows 108 can depict, e.g., numbers, letters, symbols, a combination of numbers, letters and/or symbols, or the like. The indicia 103 of the product identification tag 100 can be varied accordingly to allow a user to capture a variety of serial numbers depending on the length of and characters utilized in the serial number. For example, to capture distinctive identification information for a specific product, e.g., a six digit serial number, the product identification tag 100 can include six columns 107, one column 107 for each digit, and ten rows 108. In particular, the rows 108 can be numbered from 0 to 9 under each column 107 to permit a user to select the applicable digit of the serial number. Thus, a user can pierce and/or punch the digits of each column 107 and row 108 corresponding to the serial number. The first, second, third, fourth, fifth and sixth digits of the serial number can correspond to the first, second, third, fourth, fifth and sixth columns 107a to 107f, respectively.

In addition, the product identification tag 100 can be configured and dimensioned based on, e.g., the amount of indicia 103 to be included, the intended products to be used in conjunction with the product identification tag 100, the amount of visibility desired, and the like. For example, the product identification tag 100 can have a width 105 of about 1.25 inches and a length 106 of about 1.75 inches to provide sufficient visibility of the indicia 103 and sufficient space for a user to capture, e.g., pierce, punch out, or the like, the distinctive serial number for a specific product. However, if greater visibility of the captured distinctive identification information is desired, greater dimensions can be implemented. Although illustrated as a rectangular product identification tag 100, it should be understood that the exemplary product identification tag 100 can be a variety of configurations, e.g., square, rectangular, circular, or the like. The exemplary product identification tag 100 can further include an attachment means (not shown) for detachably securing the product identification tag 100 to the specific product. The attachment means can be, e.g., rivets, wire lanyard, grommets with nylon tie, a heat seal, RF welding, stitching, adhesive, screws, pressure sensitive adhesives, or the like. For example, the exemplary product identification tag 100 may be stitched to a portion of a product at the clear background surface 102 section next to the useful information label 104. The product identification tag 100 can thereby be attached to a product at one side, while leaving the "capturing" area, i.e., the plurality of rows and columns 108 and 107, as an unattached flap capable of capturing, e.g., piercing, punching out, and the like, distinctive identification information for a specific product in the field.

Figure 2:
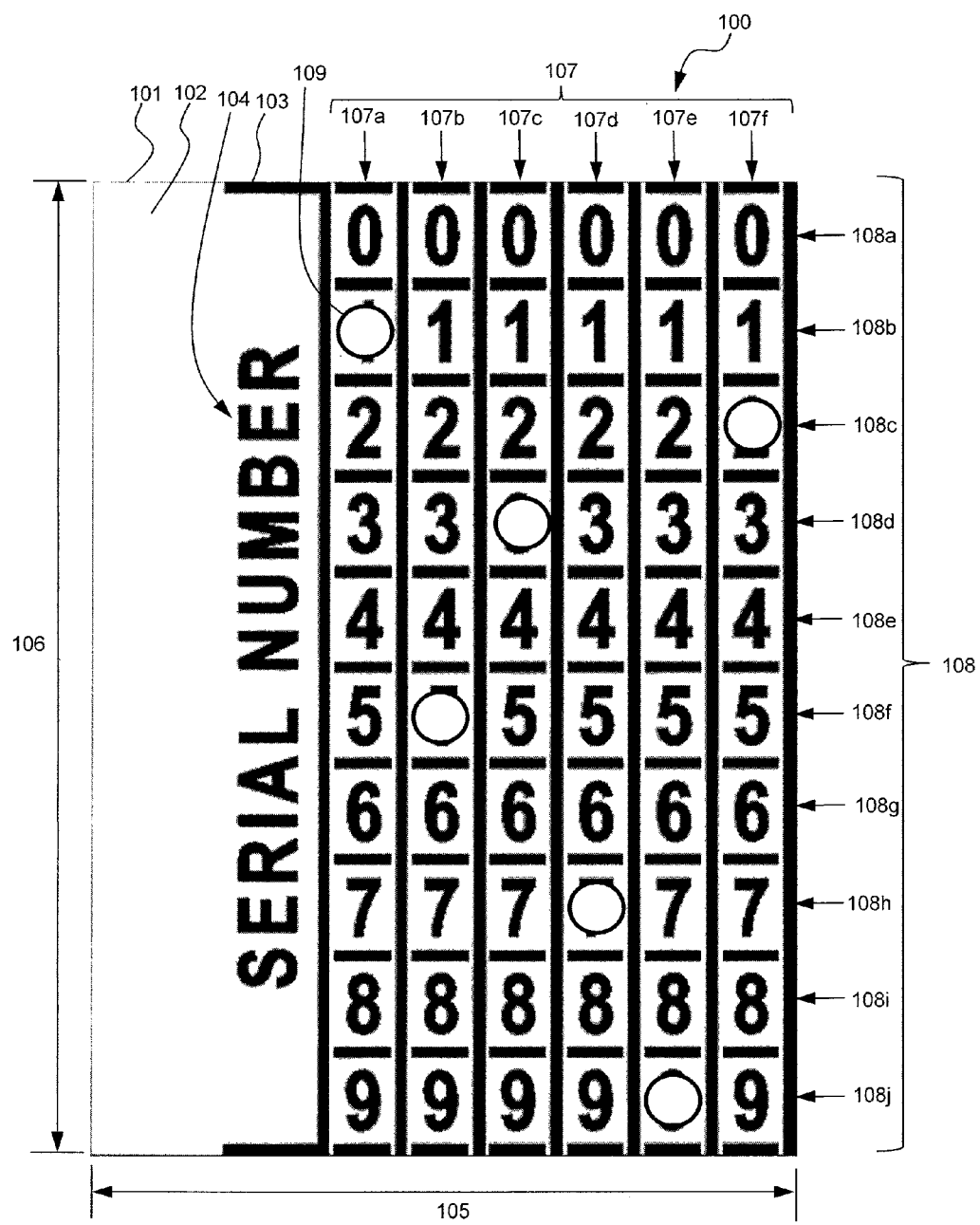
FIG. 2 shows an exemplary product identification tag with a captured serial number as distinctive identification information.

With reference to FIG. 2, the exemplary product identification tag 100 is illustrated, including captured distinctive identification information for a specific product, i.e., a serial number. The distinctive serial number captured by punching out the corresponding digits of the plurality of columns 107 and rows 108 can be perceived by the corresponding capture marks 109 in each column 107. In particular, the first column 107a corresponds to the first digit of the serial number, i.e., 1, the second column 107b corresponds to the second digit of the serial number, i.e., 5, the third column 107c corresponds to the third digit of the serial number, i.e., 3, the fourth column 107d corresponds to the fourth digit of the serial number, i.e., 7, the fifth column 107e corresponds to the fifth digit of the serial number, i.e., 9, and the sixth column 107f corresponds to the sixth digit of the serial number, i.e., 2. Thus, the distinctive serial number "153792" can be accurately captured and/or visualized on the product identification tag 100. The durable material 101 and/or the raised indicia 103 and the punched out capture marks 109 further ensure that the distinctive identification information for the specific product will not tear, rub off or otherwise be rendered unreadable over time.

Figure 3:
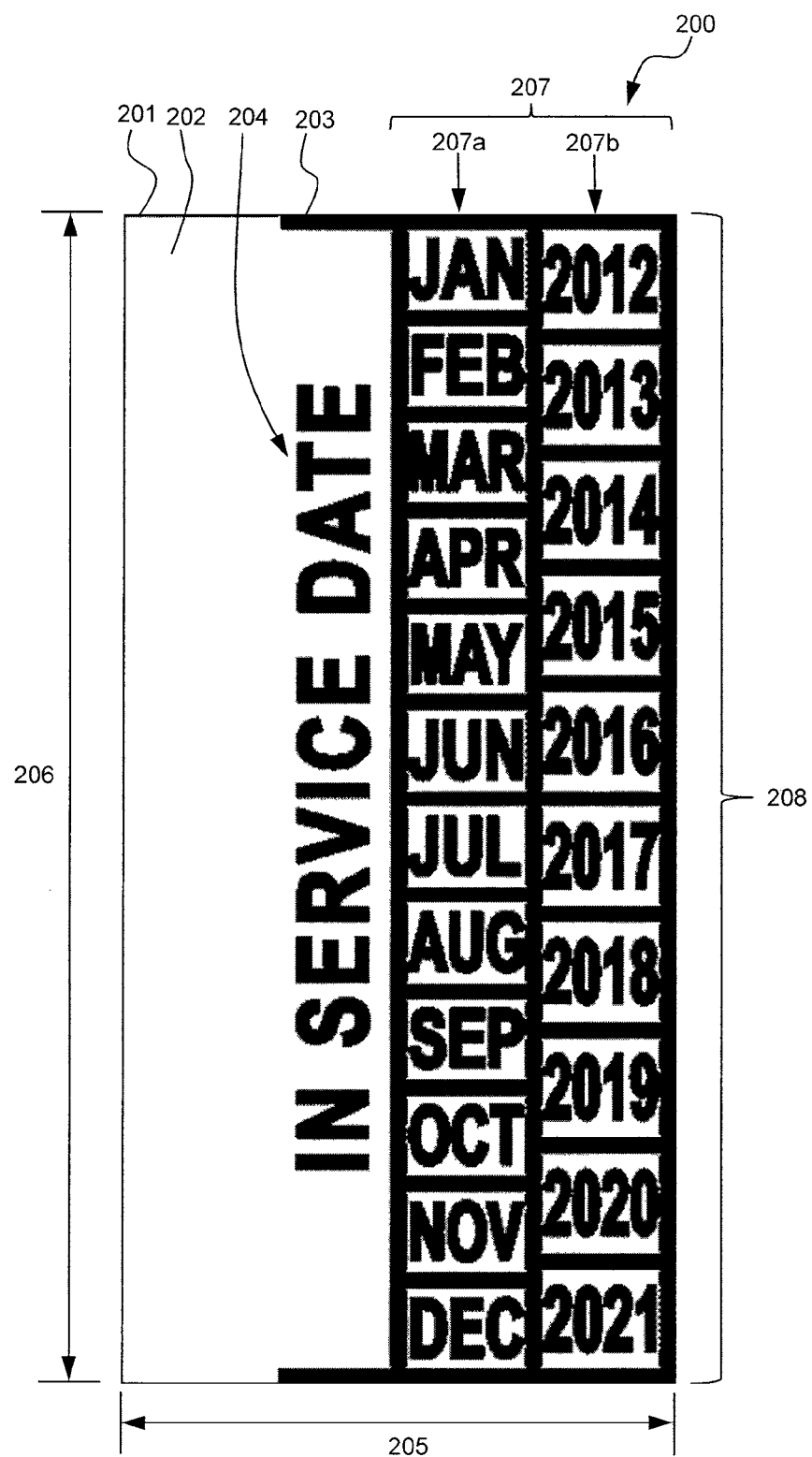
FIG. 3 shows an exemplary product identification tag with an in-service date as distinctive identification information.

Turning now to FIG. 3, an exemplary product identification tag 200 is presented with an in-service date as the distinctive identification information for a specific product. The exemplary product identification tag 200 is substantially similar to the product identification tag 100 discussed previously. In particular, the product identification tag 200 generally includes a tag element/durable material 201, a background surface 202 and indicia 203 corresponding to useful information, i.e., an in-service date. The useful information label 204 can indicate which useful information and/or distinctive identification information for a specific product can be captured on the product identification tag 200. The plurality of columns 207 and rows 208 of indicia 203 can correspond to the useful information and the distinctive identification information to be captured. To capture the in-service date of a specific product, the first column 207a can correspond to, e.g., a month, and the second column 207b can correspond to, e.g., a year. The second column 207b can optionally be divided into, e.g., separate columns corresponding to each digit of the in-service year in order to permit a greater range of in-service years to be captured. Further, the plurality of columns 207 can include two columns and additional indicia 203 for capturing the in-service day digits. The indicia 203 of the plurality of columns 207 and rows 208 can be, e.g., pierced, punched out, or the like, to capture the distinctive identification information for a specific product.

Due to the lower amount of indicia 203 included on the tag element/durable material 201, the dimensions, e.g., the width 205 and length 206 of the product identification tag 200, can be adjusted accordingly. Thus, the exemplary product identification tag 200 can have a width 205 of about 0.825 inches and a length 206 of about 1.75 inches. However, it should be understood that the configurations and/or dimensions of the exemplary product identification tag 200 and the alternative exemplary tags discussed herein can be adjusted based on, e.g., the amount of indicia 203 to be included, the intended products to be used in conjunction with the product identification tag 200, the amount of visibility desired, the final application of the exemplary product identification tags, and the like.

Figure 4:
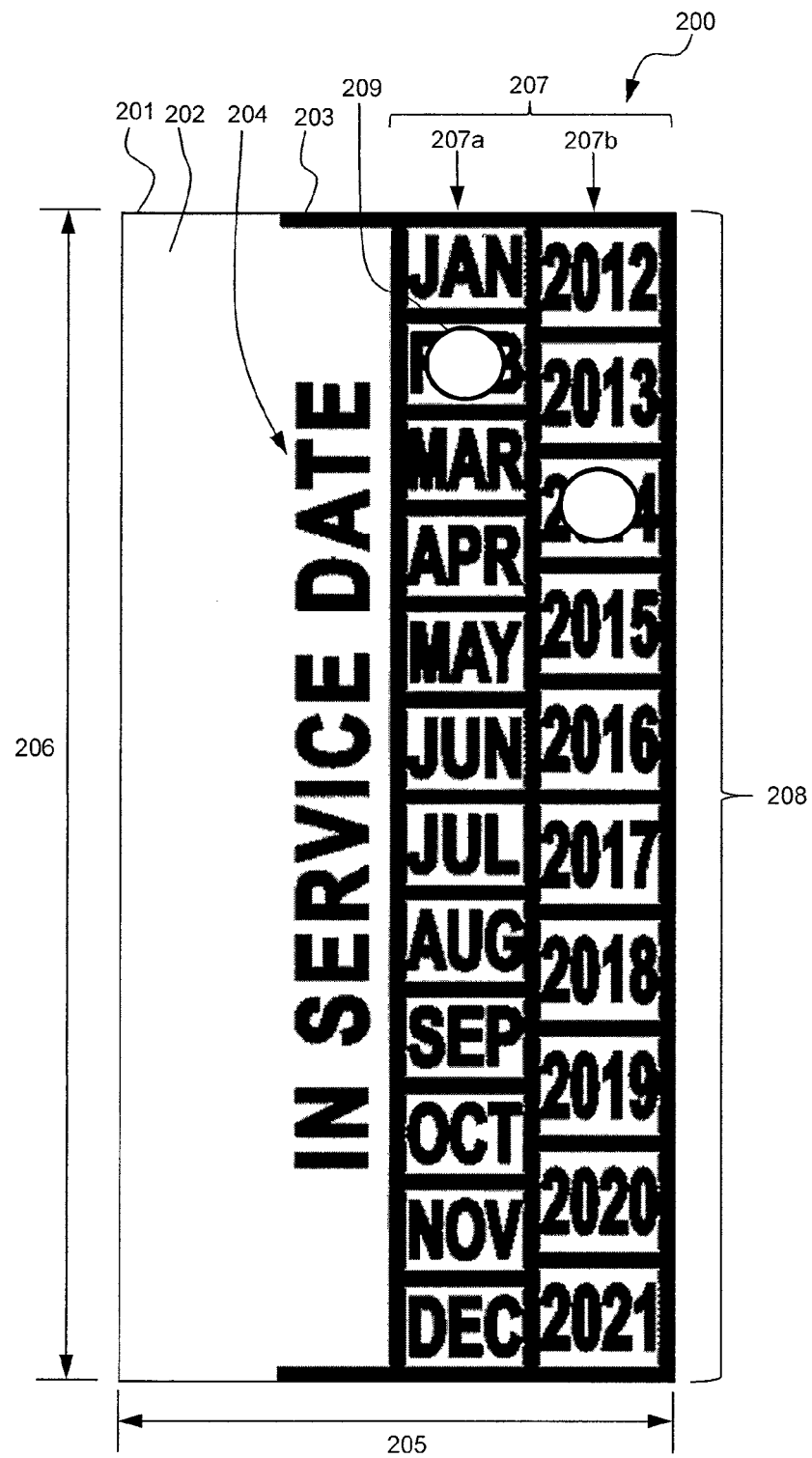
FIG. 4 shows an exemplary product identification tag with a captured in-service date as distinctive identification information.

With reference to FIG. 4, the exemplary product identification tag 200 is illustrated, including captured distinctive identification information for a specific product, i.e., an in-service date. The distinctive in-service date captured by punching out the corresponding month and year of the plurality of columns 207 and rows 208 can be perceived by the corresponding capture marks 209 in each column 207. In particular, the first column 207a corresponds to the month of the in-service date, i.e., February, and the second column 207b corresponds to the year of the in-service date, i.e., 2014. Thus, the distinctive in-service date "February 2014" can be accurately captured and/or visualized on the product identification tag 200. As noted above, the exemplary product identification tag 200 can optionally further include columns and indicia 203 for capturing the day of the in-service date. For example, the distinctive in-service date can then be captured as, e.g., Feb. 15, 2014, with one column corresponding to the first digit of the day, i.e., 1, and another column corresponding to the second digit of the day, i.e., 5.

Figure 5:
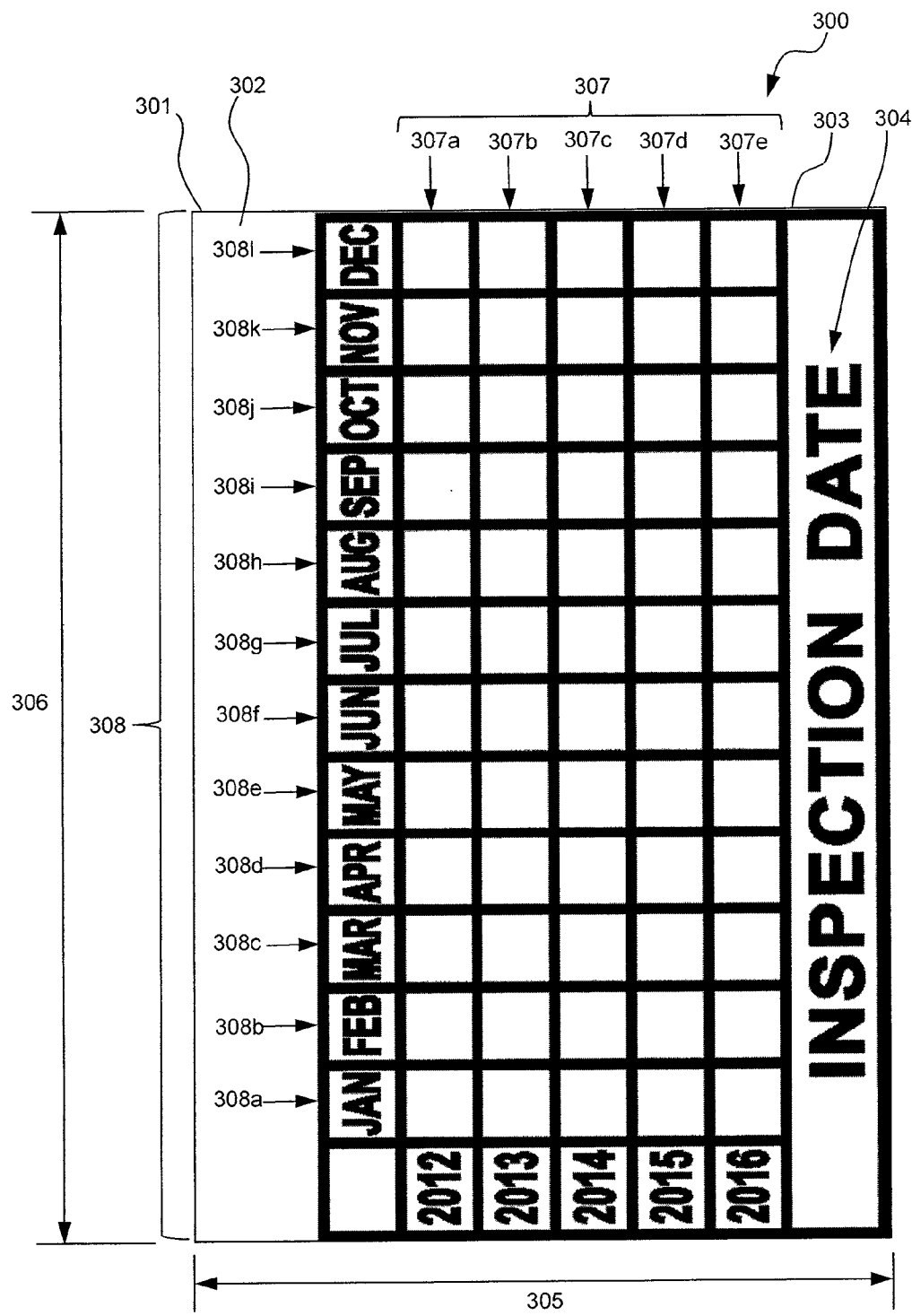
FIG. 5 shows an exemplary product identification tag with an inspection date as distinctive identification information.

Turning now to FIG. 5, an exemplary product identification tag 300 is presented with an inspection date as the distinctive identification information for a specific product. The exemplary product identification tag 300 is substantially similar to the product identification tag 100 discussed previously. In particular, the product identification tag 300 generally includes a tag element/durable material 301, a background surface 302 and indicia 303 corresponding to useful information, i.e., an inspection date. The useful information label 304 can indicate which useful information and/or distinctive identification information for a specific product can be captured on the product identification tag 300. The plurality of columns 307 and rows 308 of indicia 303 can create a grid which corresponds to the useful information and the distinctive identification information to be captured. To capture the inspection date of a specific product, the plurality of columns 307 can correspond to, e.g., a year, and the plurality of rows 308 can correspond to, e.g., a month. The indicia 303, i.e., the corresponding cell of the grid created by the plurality of columns 307 and rows 308, can be, e.g., pierced, punched out, or the like, to capture the distinctive identification information for a specific product. Thus, a user can capture the distinctive inspection date by aligning and punching out the appropriate grid cell corresponding to the year and month of the inspection.

Due to the different amount of indicia 303 included on the durable material 301, the dimensions, e.g., the width 305 and length 306 of the product identification tag 300, can be adjusted accordingly. For example, the width 305 of the product identification tag 300 can be increased for capturing a greater range of inspection years. In addition, it should be understood that the configurations and/or dimensions of the exemplary product identification tag 300 can be adjusted based on, e.g., the amount of indicia 303 to be included, the intended products to be used in conjunction with the product identification tag 300, the amount of visibility desired, and the like.

Figure 6:
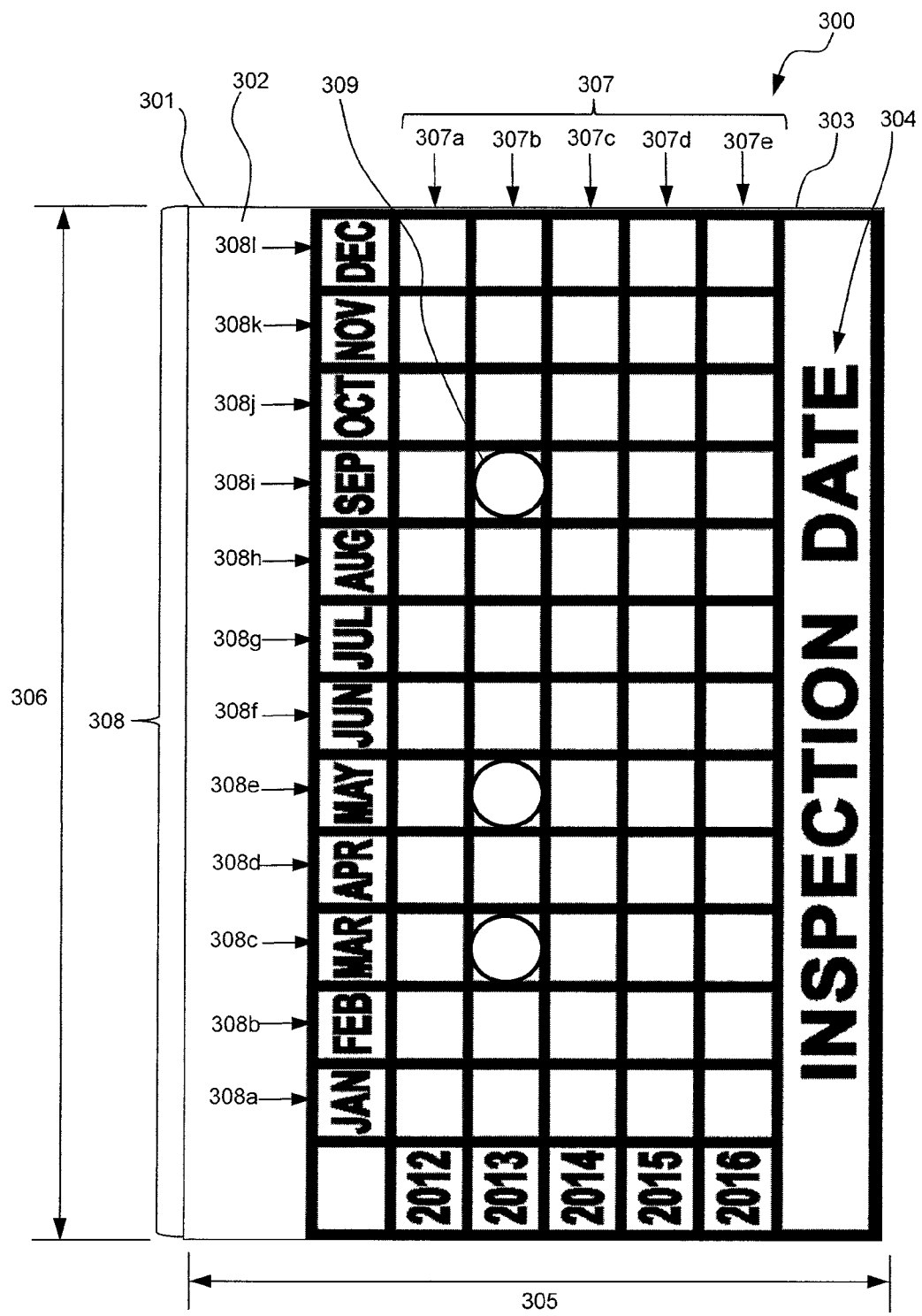
FIG. 6 shows an exemplary product identification tag with a captured inspection date as distinctive identification information.

With reference to FIG. 6, the exemplary product identification tag 300 is illustrated, including captured distinctive identification information for a specific product, i.e., an inspection date. The distinctive inspection date captured by aligning and punching out the corresponding month and year of the plurality of columns 307 and rows 308 can be perceived by the corresponding capture marks 309 in each column 307. In particular, the second column 307b corresponds to the year of the inspection date, i.e., 2013, and the third, fifth and ninth rows 308c, 308e and 308i, respectively, correspond to the month of the inspection date, i.e., March, May and September, respectively. Thus, the distinctive inspection dates "March 2013", "May 2013" and "September 2013" can be accurately captured and/or visualized on the product identification tag 300. If, for example, bi-monthly inspections are to be provided to a specific product, the product identification tag 300 conveniently provides a visual reference of the dates inspections were performed and/or when inspections were not performed. Thus, a user can clearly perceive from the captured inspection dates of the product identification tag 300 that bi-monthly inspections were performed in March 2013, May 2013 and September 2013. In addition, because the corresponding grid cell has not been punched out, the user can perceive that the bi-monthly inspection was not performed in July 2013.

Figure 7:
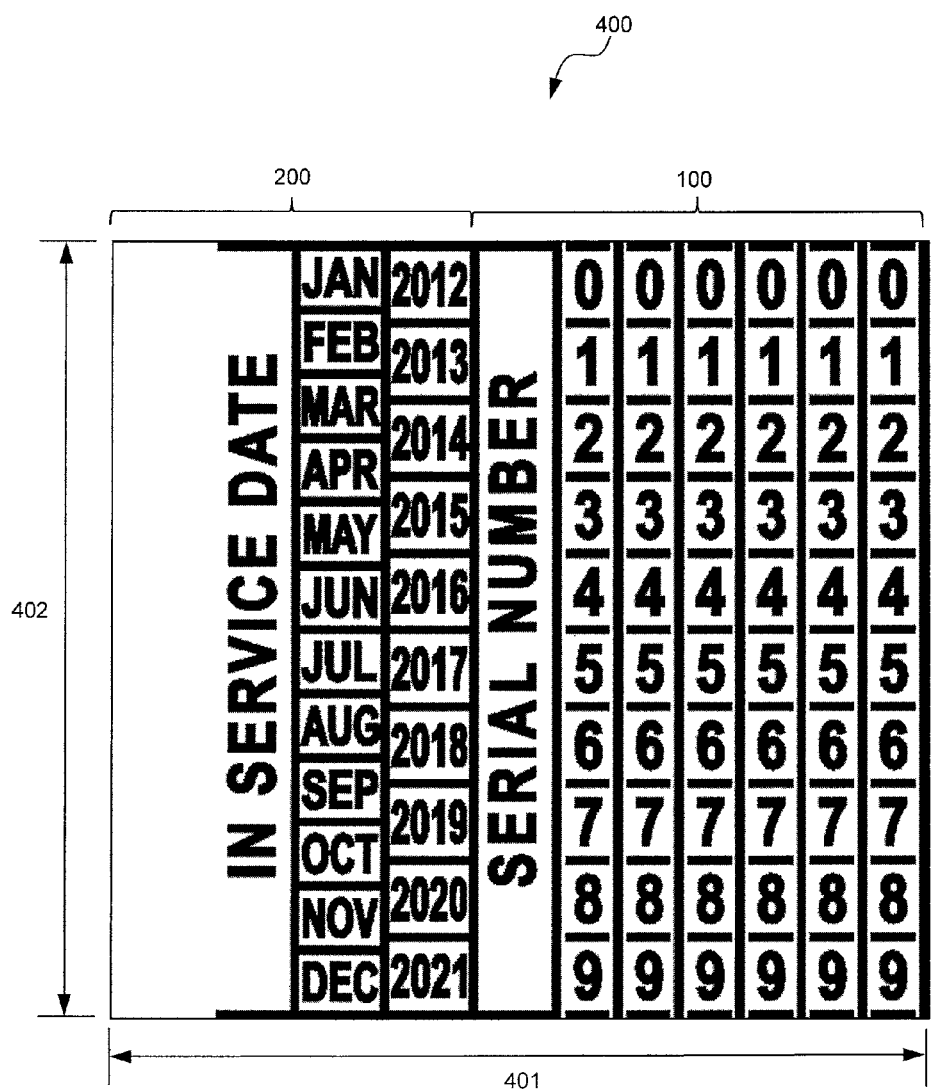
FIG. 7 shows an exemplary product identification tag with a serial number and an in-service date as distinctive identification information.

Turning now to FIG. 7, an exemplary product identification tag 400 is depicted with a serial number and an in-service date as the indicia 103 and 203 and/or the distinctive identification information to be captured for a specific product. In particular, the exemplary product identification tag 400 is a combination of the exemplary product identification tags 100 and 200 discussed above. Although combined with the product identification tag 200 to the left of the product identification tag 100, it should be understood that the product identification tags 100 and 200 can be combined in a variety of configurations. For example, the product identification tag 200 can be connected to, e.g., the left, right, top or bottom edge of the product identification tag 100. It should be further understood that the exemplary product identification tag 400 can include different types of indicia 103, 203 and/or 303, e.g., a serial number, an in-service date, an inspection date, or the like. Due to the greater amount of indicia 103 and 203 included on the product identification tag 400, the dimensions, e.g., the width 401 and length 402 of the product identification tag 400, can be adjusted accordingly. Thus, the exemplary product identification tag 400 can have a width 401 of about 1.84 inches and a length 402 of about 1.75 inches.

Figure 8:
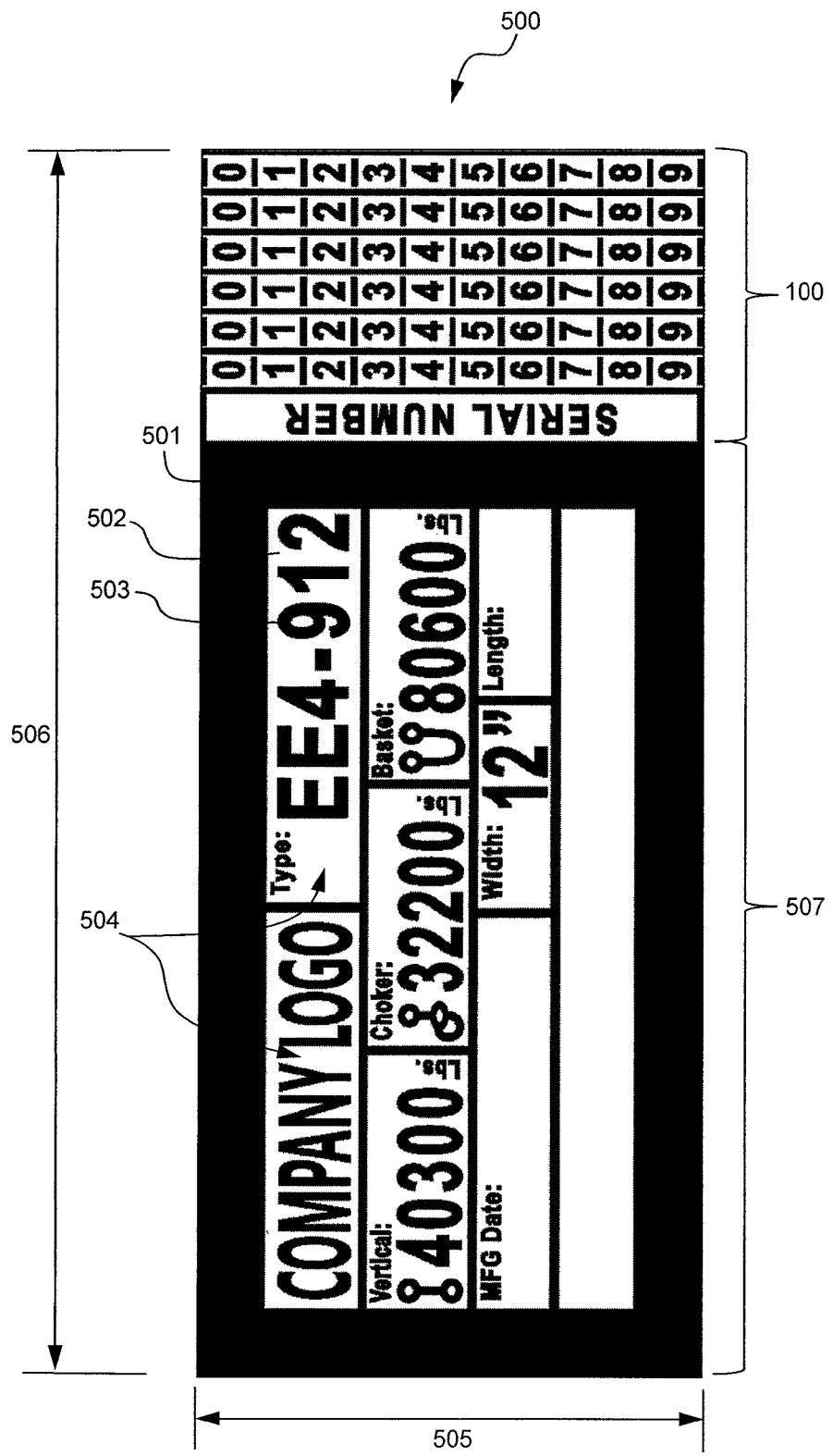
FIG. 8 shows an exemplary product identification tag with a serial number as distinctive identification information.

With reference to FIG. 8, an exemplary product identification tag 500 is illustrated with a serial number as the indicia 103 and/or the distinctive identification information to be captured for a specific product. The exemplary product identification tag 500 is a combination of the exemplary product identification tag 100 discussed above and an exemplary product information tag 507. Although combined with the product identification tag 100 at the top of the product information tag 507, it should be understood that the product identification tag 100 and the product information tag 507 can be combined in a variety of configurations. For example, the product identification tag 100 can be connected to, e.g., the left, right, top or bottom edge of the product information tag 507. It should be further understood that the exemplary product identification tag 500 can include different types of indicia 103, 203 and/or 303, e.g., a serial number, an in-service date, an inspection date, a combination of indicia 103, 203 and/or 303, or the like.

The product information tag 507 of the exemplary product identification tag 500 can be manufactured substantially similarly to the previously discussed product identification tags 100, 200, 300 and 400. Thus, the product information tag 507 can be fabricated from a tag element/durable material 501. Further, the product information tag 507 can include a background surface 502 and indicia 503. However, rather than molded for being, e.g., pierced, punched out, or the like, to capture distinctive identification information for a specific product, the product information tag 507 can be pre-printed and/or pre-formed with raised indicia 503 to depict standard and/or known useful information 504 for the specific product. The useful information 504 can include, e.g., a logo, a plurality of product dimensions, a product description, a product type, a manufacturing date, a serial number, miscellaneous and/or additional notes, and the like. The plurality of product dimensions can include, e.g., the product height, length, width, weight, and the like. When desired, the product identification tag 100 of the product identification tag 500 can be implemented for capturing the distinctive identification information for a specific product, i.e., the serial number, as previously described. Thus, a user can capture the distinctive identification information for a specific product in real-time.

Due to the combination of the product identification tag 100 and the product information tag 507, the dimensions, e.g., the width 505 and the length 506 of the product identification tag 500, can be adjusted accordingly. It should be understood that the configurations and/or dimensions of the exemplary product identification tag 500 can be adjusted based on, e.g., the types of product identification tags 100, 200, 300 and 400 to be combined with the product information tag 507, the amount of indicia 503 to be included, the intended products to be used in conjunction with the product identification tag 500, the amount of visibility desired, the final application of the product information tag 507, and the like.

Figure 9:
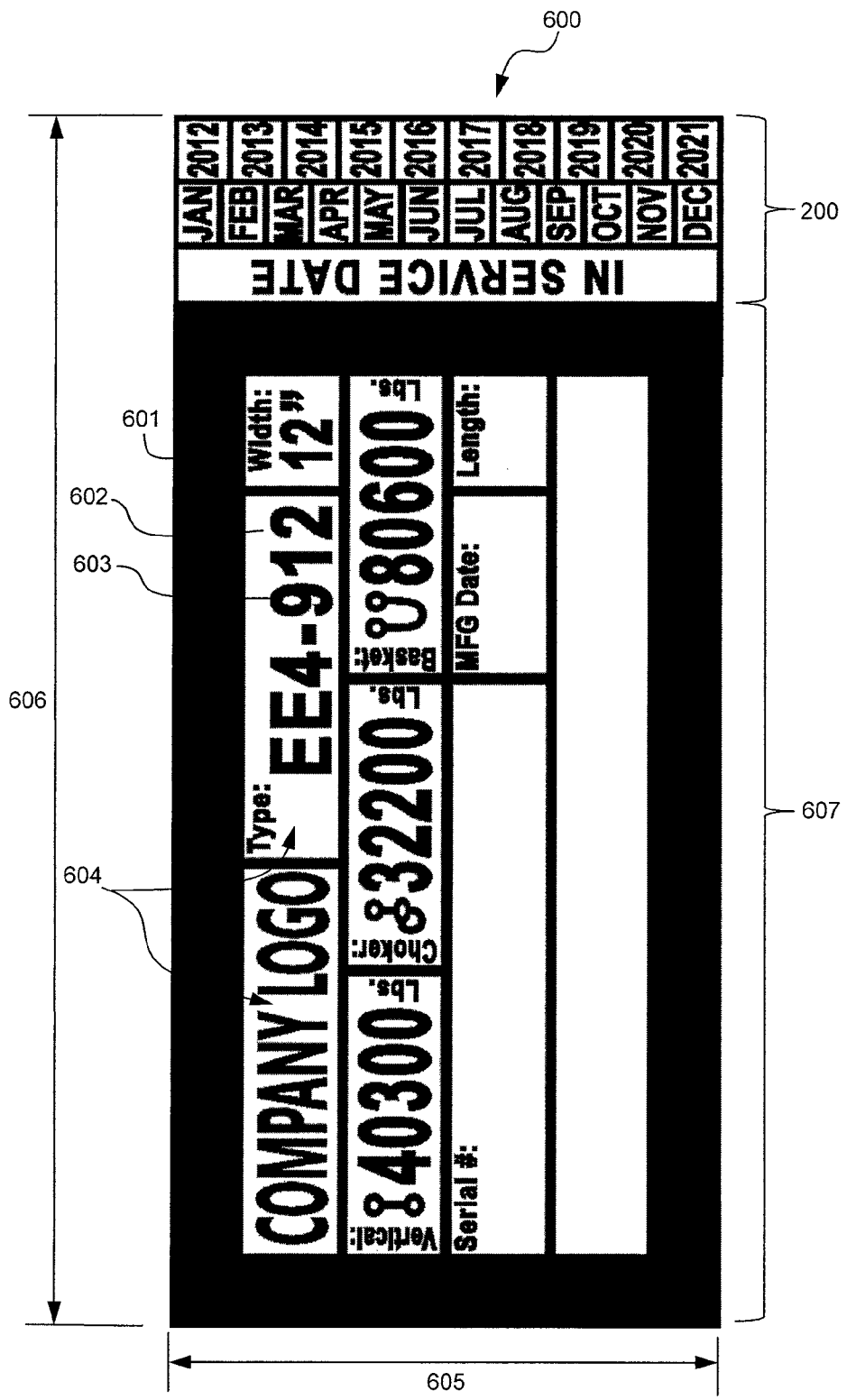
FIG. 9 shows an exemplary product identification tag with an in-service date as distinctive identification information.

Turning to FIG. 9, an exemplary product identification tag 600 is illustrated with an in-service date as the indicia 203 and/or the distinctive identification information to be captured for a specific product. The exemplary product identification tag 600 is substantially similar to the product identification tag 500 discussed above. However, rather than the combination of a product identification tag 100, the exemplary product identification tag 600 is a combination of the exemplary product identification tag 200 discussed above and an exemplary product information tag 607. The product information tag 607 is substantially similar to the product information tag 507 discussed above. The useful information 604 depicted on the product information tag 607 can include, e.g., a logo, a plurality of product dimensions, a product description, a product type, a manufacturing date, a serial number, miscellaneous and/or additional notes, and the like. The plurality of product dimensions can include, e.g., the product height, length, width, weight, and the like. When desired, the product identification tag 200 of the product identification tag 600 can be implemented for capturing the distinctive identification information for a specific product, i.e., the in-service date, as previously described.

Figure 10:
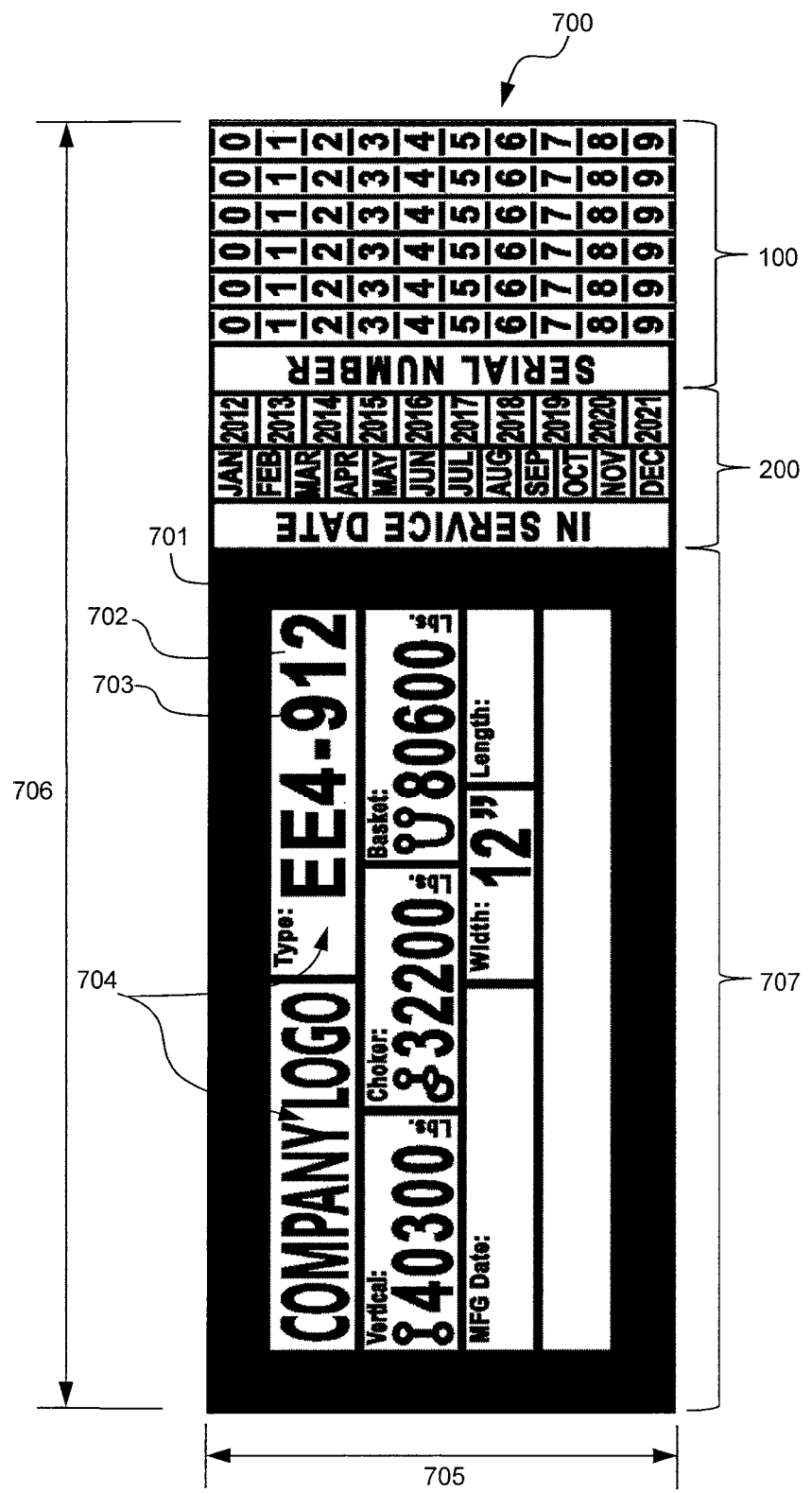
FIG. 10 shows an exemplary product identification tag with a serial number and an in-service date as distinctive identification information.

With reference to FIG. 10, an exemplary product identification tag 700 is illustrated with a serial number and an in-service date as the indicia 103 and 203, respectively, and/or the distinctive identification information to be captured for a specific product. The exemplary product identification tag 700 is substantially similar to the product identification tags 500 and 600 discussed above. However, the exemplary product identification tag 700 is a combination of the exemplary product identification tags 100 and 200 and an exemplary product information tag 707. It should be understood that the exemplary product identification tag 700 can be a combination of the product information tag 707 and any or all of the exemplary product identification tags 100, 200, 300 or 400 previously discussed. Further, the product information tag 707 is substantially similar to the product information tags 507 and 607 previously discussed.

The useful information 704 depicted on the product information tag 707 can include, e.g., a logo, a plurality of product dimensions, a product description, a product type, a manufacturing date, a serial number, miscellaneous and/or additional notes, and the like. The plurality of product dimensions can include, e.g., the product height, length, width, weight, and the like. When desired, the product identification tags 100 and 200 of the product identification tag 700 can be implemented for capturing the distinctive identification information for a specific product, i.e., the serial number and the in-service date, as previously described. Thus, a user can capture the distinctive identification information for a specific product in real-time, e.g., when a serial number is assigned to a product, when the product is placed in service, and the like.

Figure 11:
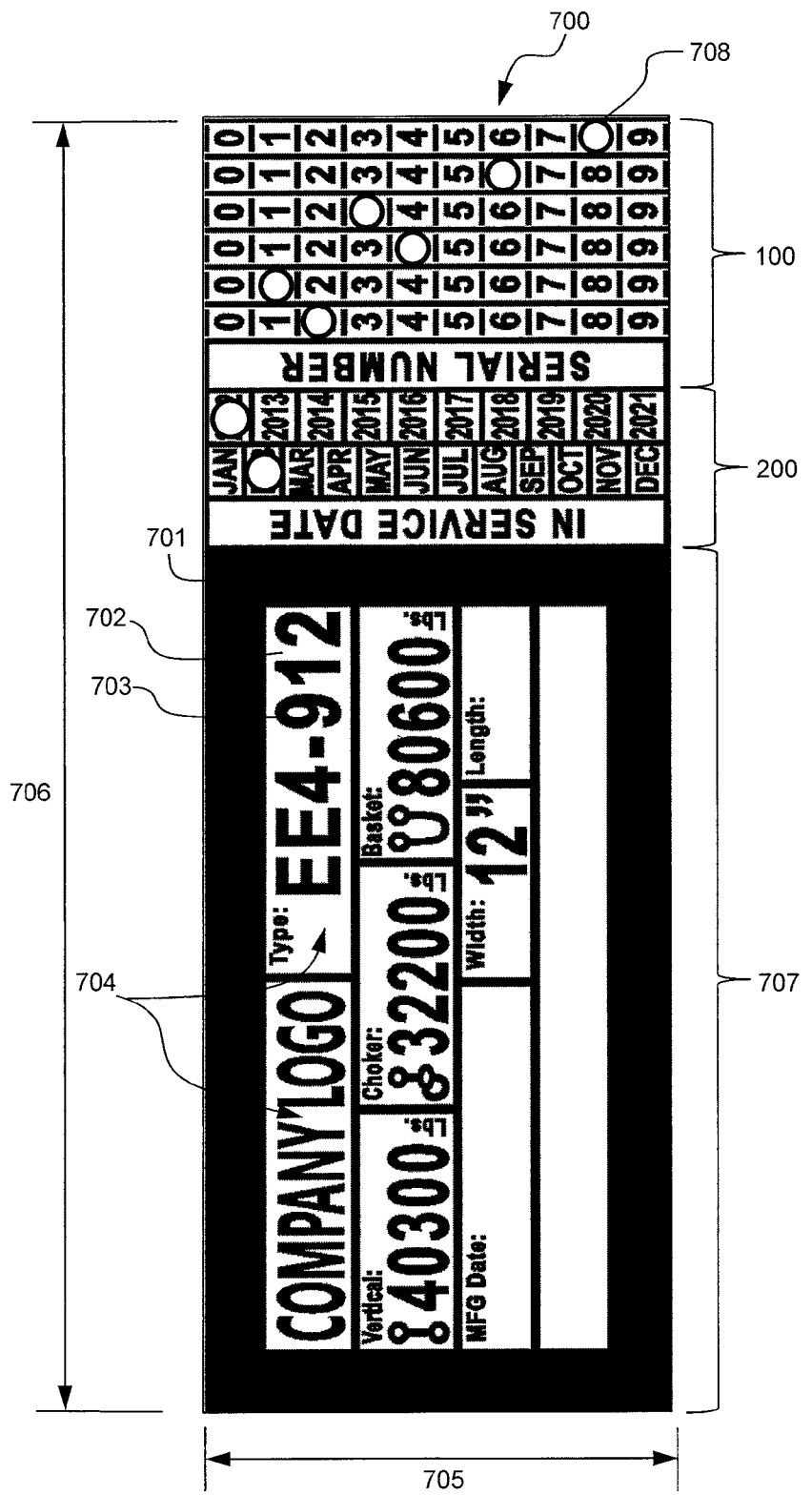
FIG. 11 shows an exemplary product identification tag with a captured serial number and in-service date as distinctive identification information.

With reference now to FIG. 11, the exemplary product identification tag 700 is depicted, including captured distinctive identification information for a specific product, i.e., a serial number and an in-service date. The distinctive serial number and in-service date captured by punching out the corresponding digits, month and year of the plurality of columns and rows of the product identification tags 100 and 200 can be perceived by the corresponding capture marks 708. In particular, with respect to the product identification tag 100, the first column 107a corresponds to the first digit of the serial number, i.e., 2, the second column 107b corresponds to the second digit of the serial number, i.e., 1, the third column 107c corresponds to the third digit of the serial number, i.e., 4, the fourth column 107d corresponds to the fourth digit of the serial number, i.e., 3, the fifth column 107e corresponds to the fifth digit of the serial number, i.e., 6, and the sixth column 107f corresponds to the sixth digit of the serial number, i.e., 8. Thus, the distinctive serial number "214368" can be accurately captured and/or visualized on the product identification tag 100.

With respect to the product identification tag 200, the first column 207a corresponds to the month of the in-service date, i.e., February, and the second column 207b corresponds to the year of the in-service date, i.e., 2012. Thus, the distinctive in-service date "February 2012" can be accurately captured and/or visualized on the product identification tag 200. Thus, the tag element/durable material 701 and the punched out capture marks 708 ensure that the distinctive identification information for the specific product will not tear, rub off or otherwise be rendered unreadable over time.

Figure 12:
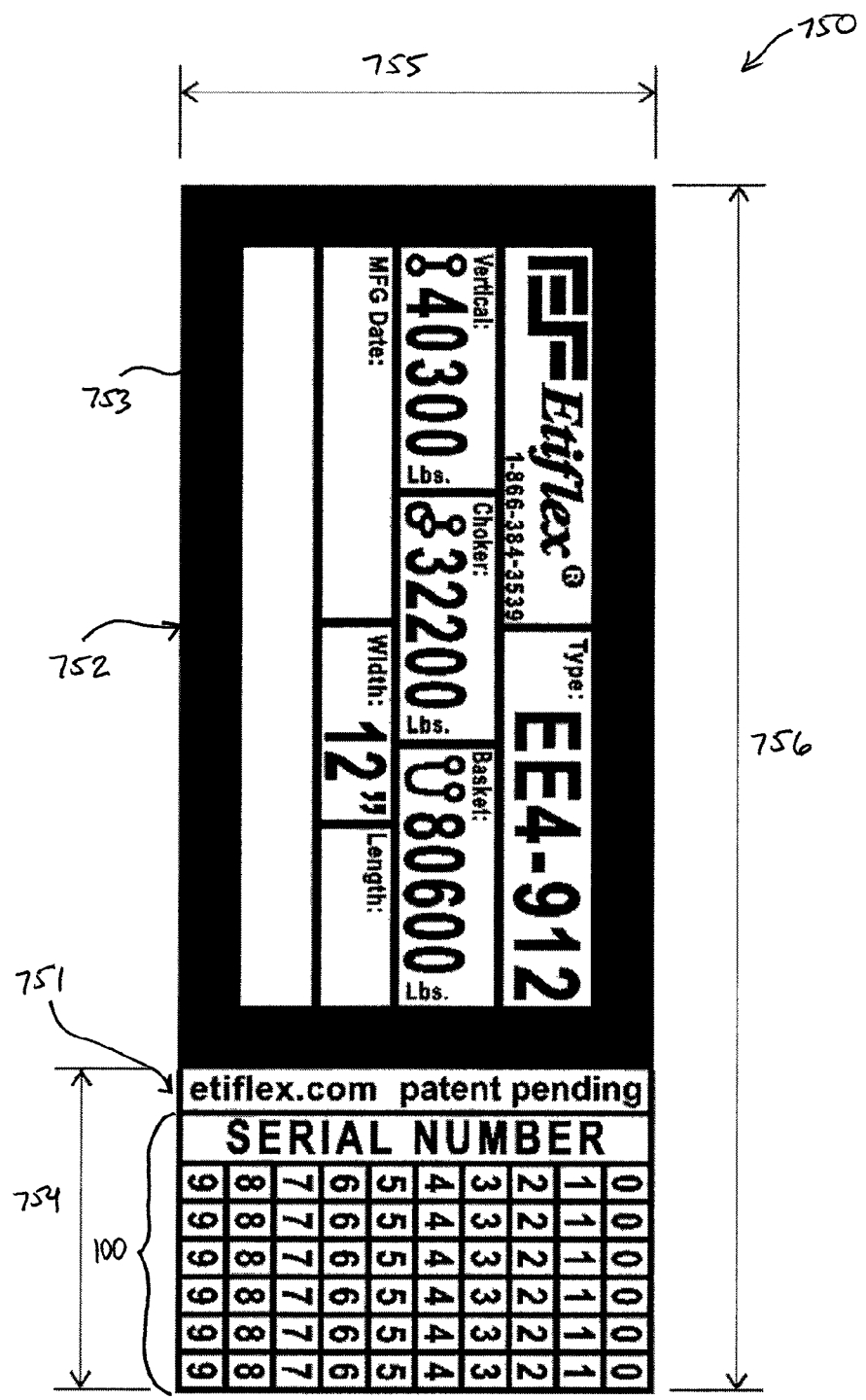
FIG. 12 shows an exemplary product identification tag with a serial number as distinctive identification information.

Turning now to FIG. 12, an exemplary product identification tag 750 is illustrated with a serial number as the indicia 103, i.e., the distinctive identification information to be captured for a specific product. The product information tag 750 can be manufactured substantially similarly to the previously discussed product identification tags. The exemplary product identification tag 750 can be a combination of the exemplary product identification tag 100 discussed above and an exemplary product information tag 752. In some exemplary embodiments, the product identification tag 750 can include a matrix for selection of a material type (not shown). For example, the exemplary matrix may include a list of materials, such as nylon, polyester, and the like, and a box to be pierced and/or punched next to each material. A user can thereby pierce and/or punch the appropriate box to mark the type of material. The product information tag 752 can be substantially similar to the product information tag 507 discussed above and can include a plurality of useful information, e.g., a company logo, company contact information, a plurality of product dimensions, a product description, a product type, a manufacturing date, a serial number, instructions for use, caution/warning notes or information, miscellaneous and/or additional notes, and the like. The product identification tag 750 may include a notice section 751 for displaying, e.g., a company name, miscellaneous and/or additional notes, a patent status, and the like.

In some exemplary embodiments, the product information tag 752 can include an attachment border 753 for fixating the product identification tag 750 to a product and/or a material connected to the product, e.g., a webbing, and the like, along at least a perimeter of the product information tag 752. For example, the product information tag 752 can be attached to a product with attachment means, e.g., a heat seal, RF welding, stitching, adhesive, screws, pressure sensitive adhesives, and the like, at least at the attachment border 753. The "capturing" area, i.e., the product identification tag 100, can generally remain unattached relative to the product such that distinctive identification information for a specific product can be captured after the product identification tag 750 has been attached to the product. In particular, the product identification tag 100 can be fixated to the product at an edge adjacent to the attachment border 753 due to the fixation of the attachment border 753, while acting as a flap or flag which can be lifted from the product surface to capture the distinctive identification information, e.g., by piercing and/or punching. Thus, a user can capture the distinctive identification information for a specific product in real-time. However, it should be understood that the exemplary product identification tags discussed herein can be implemented to capture the distinctive identification information both prior to attachment to a product and after attachment to a product.

Due to the combination of the product identification tag 100, the product information tag 752, and the notice section 751, the dimensions, e.g., the width 755 and length 756 of the product identification tag 750, and the capture area length 754, can be adjusted accordingly. Thus, the product identification tag 750 can have a width 755 of about 1.75 inches and a length 756 of about 4.43 inches. The capture area length 754 can be about 1.18 inches. However, it should be understood that the configurations and/or dimensions of the exemplary product identification tag 750 and the alternative exemplary tags discussed herein can be adjusted based on, e.g., the amount of indicia 103 to be included, the intended products to be used in conjunction with the product identification tag 750, the amount of visibility desired, the final application of the product identification tag, and the like.

Figure 13:
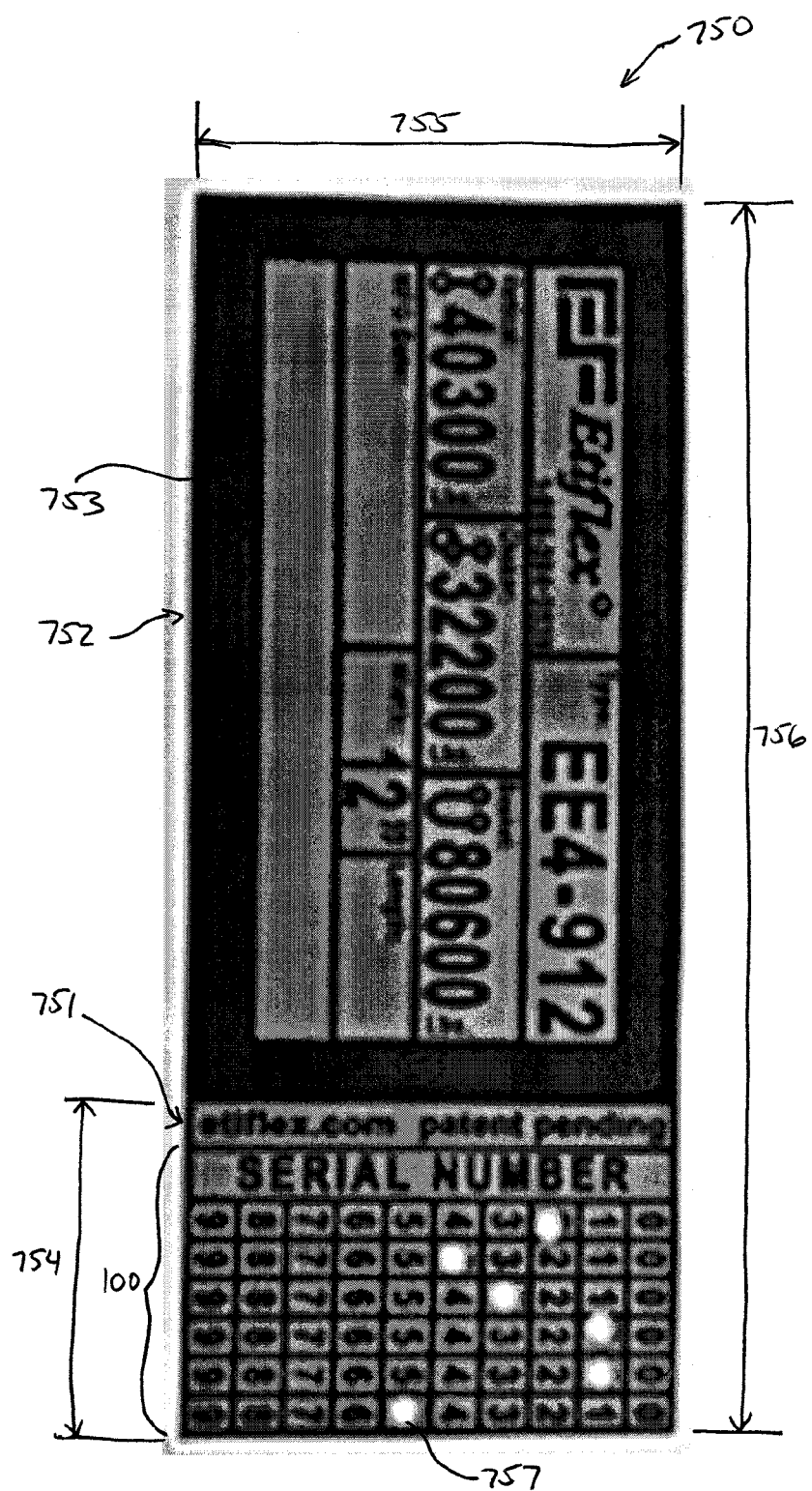
FIG. 13 shows an exemplary product identification tag with a captured serial number as distinctive identification information.

With reference to FIG. 13, the exemplary product identification tag 750 is depicted, including captured distinctive identification information for a specific product, i.e., a serial number. The distinctive serial number captured by punching out the corresponding digits of the plurality of columns and rows of the product identification tag 100 can be perceived by the corresponding capture marks 757. In particular, the first column 107a corresponds to the first digit of the serial number, i.e., 2, the second column 107b corresponds to the second digit of the serial number, i.e., 4, the third column 107c corresponds to the third digit of the serial number, i.e., 3, the fourth column 107d corresponds to the fourth digit of the serial number, i.e., 1, the fifth column 107e corresponds to the fifth digit of the serial number, i.e., 1, and the sixth column 107f corresponds to the sixth digit of the serial number, i.e., 5. Thus, the distinctive serial number "243115" can be accurately captured and/or visualized on the product identification tag 100.

Figure 14:
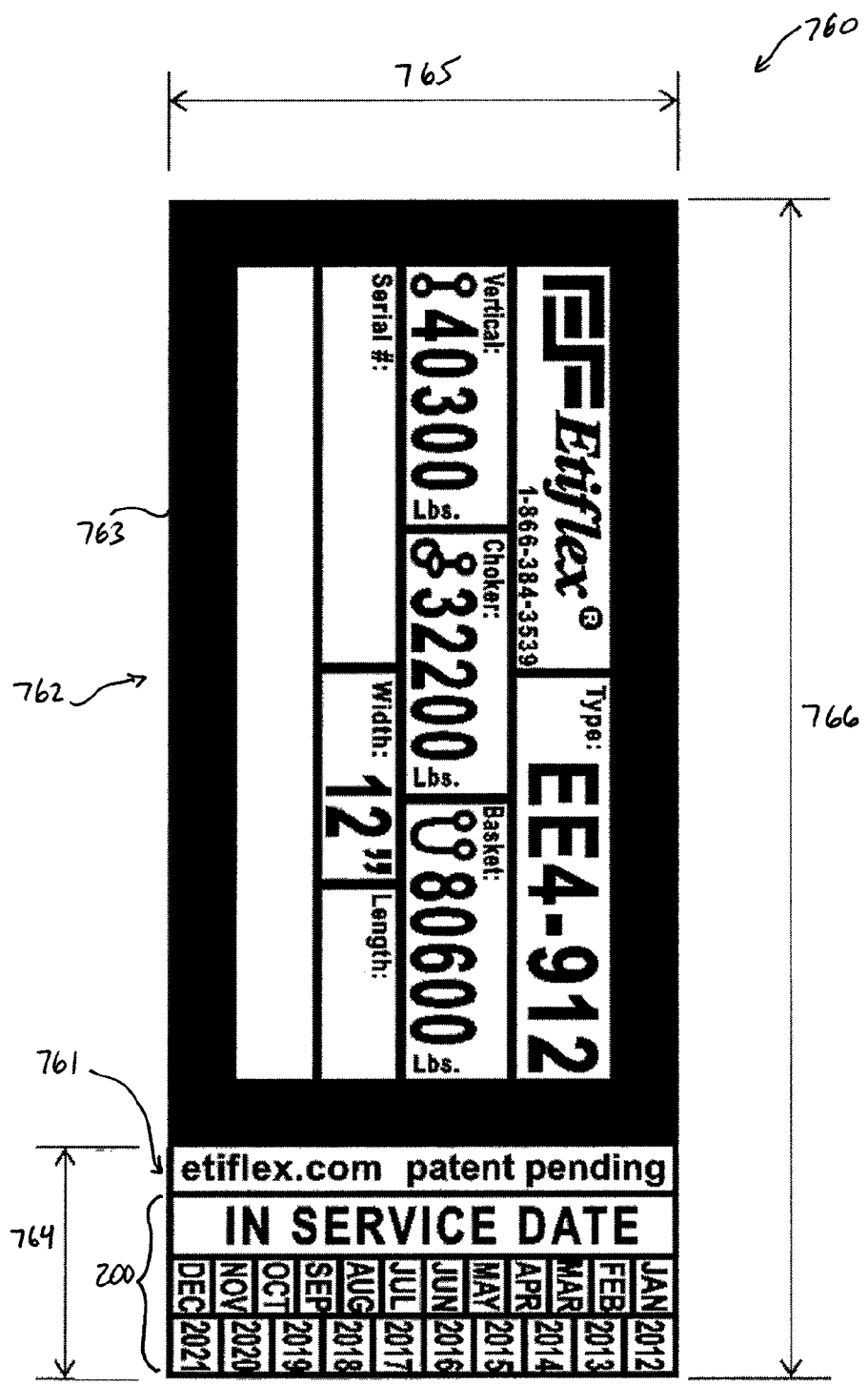
FIG. 14 shows an exemplary product identification tag with an in-service date as distinctive identification information.

Turning now to FIG. 14, an exemplary product identification tag 760 is illustrated with an in-service date as the indicia 203, i.e., the distinctive identification information to be captured for a specific product. The product information tag 760 can be manufactured substantially similarly to the previously discussed product identification tags. The exemplary product identification tag 760 can be a combination of the exemplary product identification tag 200 discussed above and an exemplary product information tag 762. The product information tag 762 can be substantially similar to the product information tag 752 discussed above. The product identification tag 760 may include a notice section 761 for displaying, e.g., a company name, miscellaneous and/or additional notes, a patent status, and the like.

In some exemplary embodiments, the product information tag 762 can include an attachment border 763 for fixating the product identification tag 760 to a product and/or a material connected to the product, e.g., a webbing, and the like, along at least a perimeter of the product information tag 752. For example, the product information tag 762 can be attached to a product with attachment means, e.g., a heat seal, RF welding, stitching, adhesive, screws, pressure sensitive adhesives, and the like, at least at the attachment border 763. The "capturing" area, i.e., the product identification tag 200, can generally remain unattached relative to the product such that distinctive identification information for a specific product can be captured after the product identification tag 760 has been attached to the product. In particular, the product identification tag 200 can be fixated to the product at an edge adjacent to the attachment border 763 due to the fixation of the attachment border 763, while acting as a flap or flag which can be lifted from the product surface to capture the distinctive identification information, e.g., by piercing and/or punching. Thus, a user can capture the distinctive identification information for a specific product in real-time.

Due to the combination of the product identification tag 200, the product information tag 762, and the notice section 761, the dimensions, e.g., the width 765 and length 766 of the product identification tag 760, and the capture area length 764, can be adjusted accordingly. Thus, the product identification tag 760 can have a width 765 of about 1.75 inches and a length 766 of about 4.03 inches. The capture area length 764 can be about 0.78 inches. However, it should be understood that the configurations and/or dimensions of the exemplary product identification tag 760 and the alternative exemplary tags discussed herein can be adjusted based on, e.g., the amount of indicia 203 to be included, the intended products to be used in conjunction with the product identification tag 760, the amount of visibility desired, the final application of the product identification tag, and the like.

Figure 15:
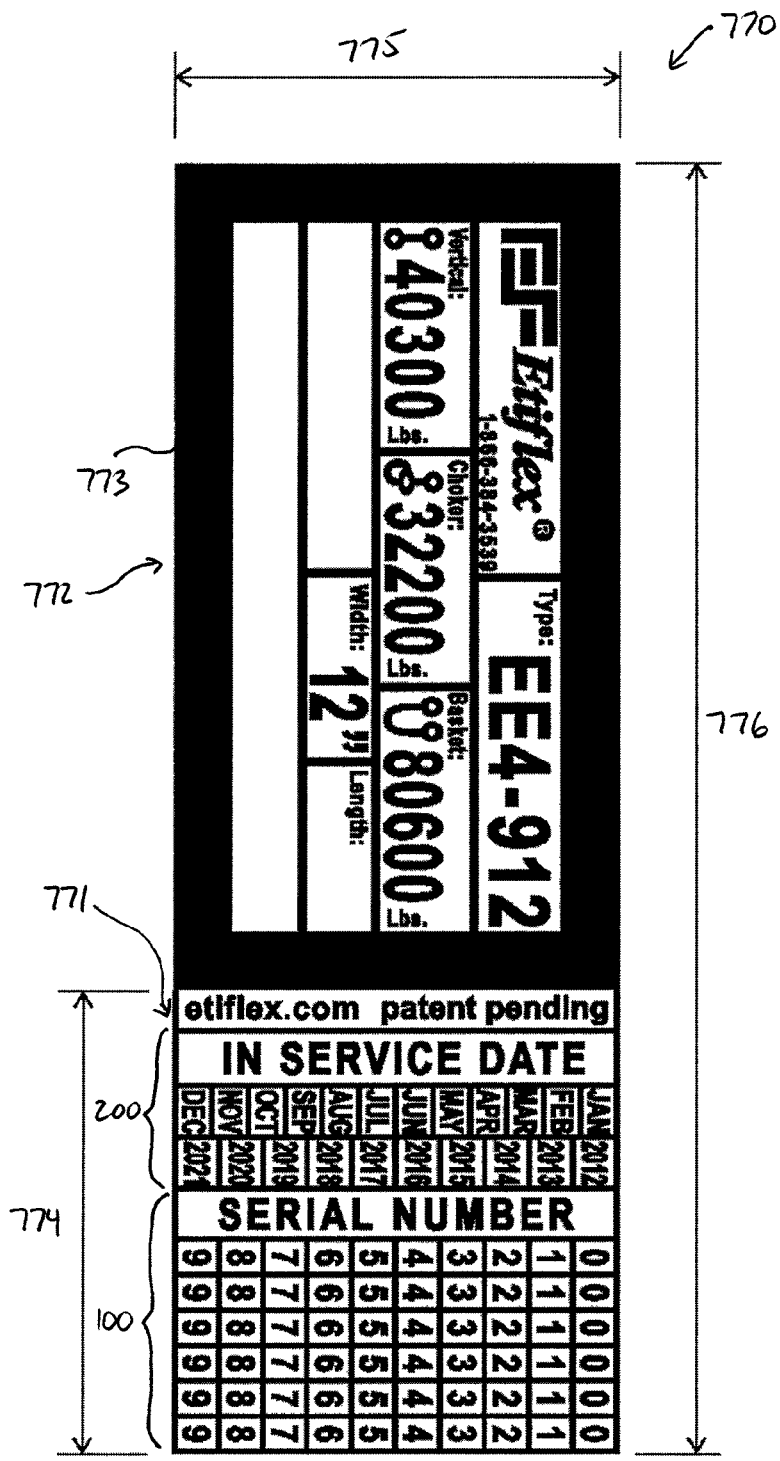
FIG. 15 shows an exemplary product identification tag with a serial number and an in-service date as distinctive identification information.

With reference to FIG. 15, an exemplary product identification tag 770 is illustrated with a serial number and an in-service date as the indicia 103 and 203, i.e., the distinctive identification information to be captured for a specific product. The product information tag 770 can be manufactured substantially similarly to the previously discussed product identification tags. The exemplary product identification tag 770 can be a combination of the exemplary product identification tags 100 and 200 discussed above and an exemplary product information tag 772. The product information tag 772 can be substantially similar to the product information tag 752 discussed above. The product identification tag 770 may include a notice section 771 for displaying, e.g., a company name, miscellaneous and/or additional notes, a patent status, and the like.

In some exemplary embodiments, the product information tag 772 can include an attachment border 773 for fixating the product identification tag 770 to a product and/or a material connected to the product, e.g., a webbing, and the like, along at least a perimeter of the product information tag 772. For example, the product information tag 772 can be attached to a product with attachment means, e.g., a heat seal, RF welding, stitching, adhesive, screws, pressure sensitive adhesives, and the like, at least at the attachment border 773. The "capturing" area, i.e., the product identification tags 100 and 200, can generally remain unattached relative to the product such that distinctive identification information for a specific product can be captured after the product identification tag 770 has been attached to the product. In particular, the product identification tags 100 and 200 can be fixated to the product at an edge adjacent to the attachment border 773 due to the fixation of the attachment border 773, while acting as a flap or flag which can be lifted from the product surface to capture the distinctive identification information, e.g., by piercing and/or punching. Thus, a user can capture the distinctive identification information for a specific product in real-time.

Due to the combination of the product identification tags 100 and 200, the product information tag 772, and the notice section 771, the dimensions, e.g., the width 775 and length 776 of the product identification tag 770, and the capture area length 774, can be adjusted accordingly. Thus, the product identification tag 770 can have a width 775 of about 1.75 inches and a length 776 of about 5.05 inches. The capture area length 774 can be about 1.81 inches. However, it should be understood that the configurations and/or dimensions of the exemplary product identification tag 770 and the alternative exemplary tags discussed herein can be adjusted based on, e.g., the amount of indicia 103 and 203 to be included, the intended products to be used in conjunction with the product identification tag 770, the amount of visibility desired, the final application of the product identification tag, and the like.

Figure 16:
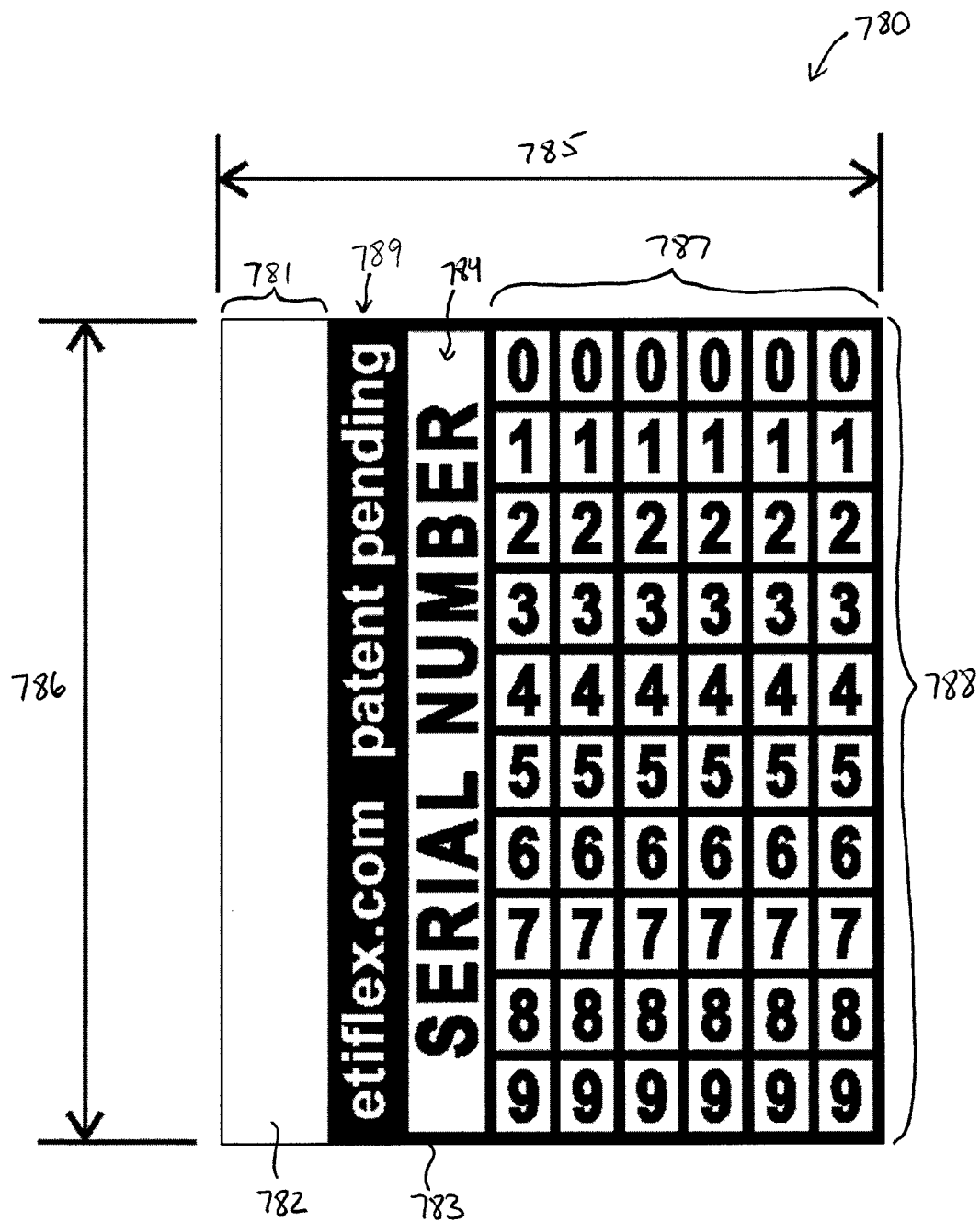
FIG. 16 shows an exemplary product identification tag with a serial number as distinctive identification information.

With reference to FIG. 16, an exemplary product identification tag 780 is illustrated with a serial number as the indicia 783, i.e., the distinctive identification information to be captured for a specific product. The product information tag 780 can be manufactured substantially similarly to the previously discussed product identification tags and can include a background surface 782 and a useful information label 284. In some exemplary embodiments, the product information tag 780 can include a notice section 789 for displaying, e.g., a company name, miscellaneous and/or additional notes, a patent status, and the like. The product information tag 780 generally includes a plurality of rows 788 and columns 787 for capturing the distinctive identification information, e.g., the serial number, for a specific product. The plurality of rows 788 and columns 787 can be substantially similar to those of the product identification tag 100 discussed previously.

The exemplary product identification tag 780 of FIG. 16 generally includes an attachment section 781 adjacent to the notice section 789 for fixating the product identification tag 780 to a product and/or a material connected to the product, e.g., a webbing, and the like. For example, the product identification tag 780 can be attached to a product with attachment means, e.g., a heat seal, RF welding, stitching, adhesive, screws, pressure sensitive adhesives, and the like, at the attachment section 781. The "capturing" area, i.e., at least the plurality of rows 788 and columns 787, can generally remain unattached relative to the product such that distinctive identification information for the product can be captured after the product identification tag 780 has been attached to the product. In particular, the product identification tag 780 can be fixated to the product such that the "capturing" area acts as a flap or flag which can be lifted from the product surface to capture the distinctive identification information. Thus, a user can capture the distinctive identification information for a specific product in real-time.

In addition, the product identification tag 780 can be configured and dimensioned based on, e.g., the amount of indicia 783 to be included, the intended products to be used in conjunction with the product identification tag 780, the amount of visibility desired, and the like. For example, the product identification tag 780 can have a width 785 of about 1.41 inches and a length 786 of about 1.75 inches to provide sufficient visibility of the indicia 783 and sufficient space for a user to capture, e.g., pierce, punch out, and the like, the distinctive serial number for the specific product. However, if greater or less visibility of the captured distinctive identification information is desired, greater or lesser dimensions can be implemented.

Figure 17:
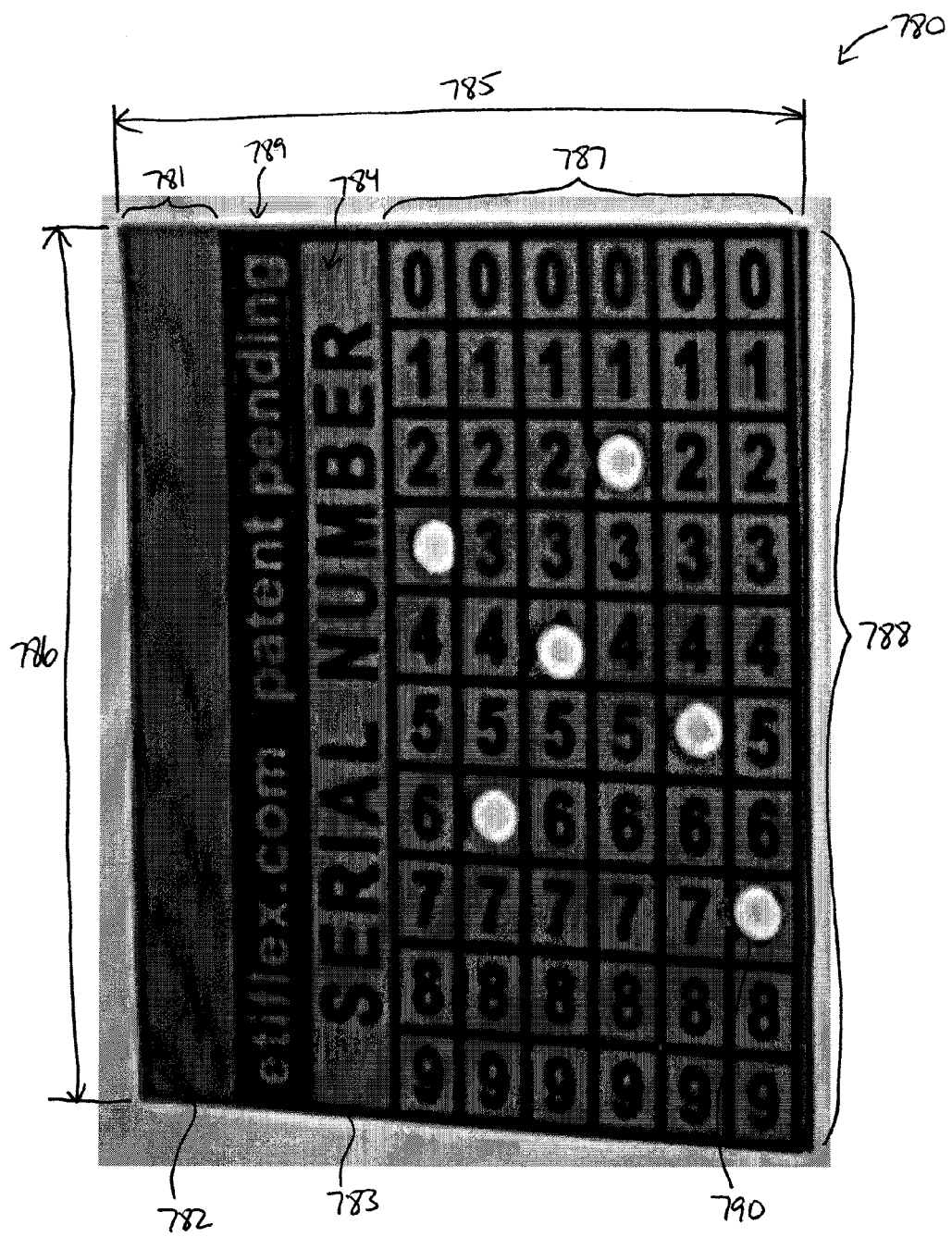
FIG. 17 shows an exemplary product identification tag with a captured serial number as distinctive identification information.

With reference to FIG. 17, the exemplary product identification tag 780 is depicted, including captured distinctive identification information for a specific product, i.e., a serial number. The distinctive serial number captured by punching out and/or piercing the corresponding digits of the plurality of rows 788 and columns 787 of the product identification tag 780 can be perceived by the corresponding capture marks 790. In particular, the first column corresponds to the first digit of the serial number, i.e., 3, the second column corresponds to the second digit of the serial number, i.e., 6, the third column corresponds to the third digit of the serial number, i.e., 4, the fourth column corresponds to the fourth digit of the serial number, i.e., 2, the fifth column corresponds to the fifth digit of the serial number, i.e., 5, and the sixth column corresponds to the sixth digit of the serial number, i.e., 7. Thus, the distinctive serial number "364257" can be accurately captured and/or visualized on the product identification tag 780.

Figure 18:
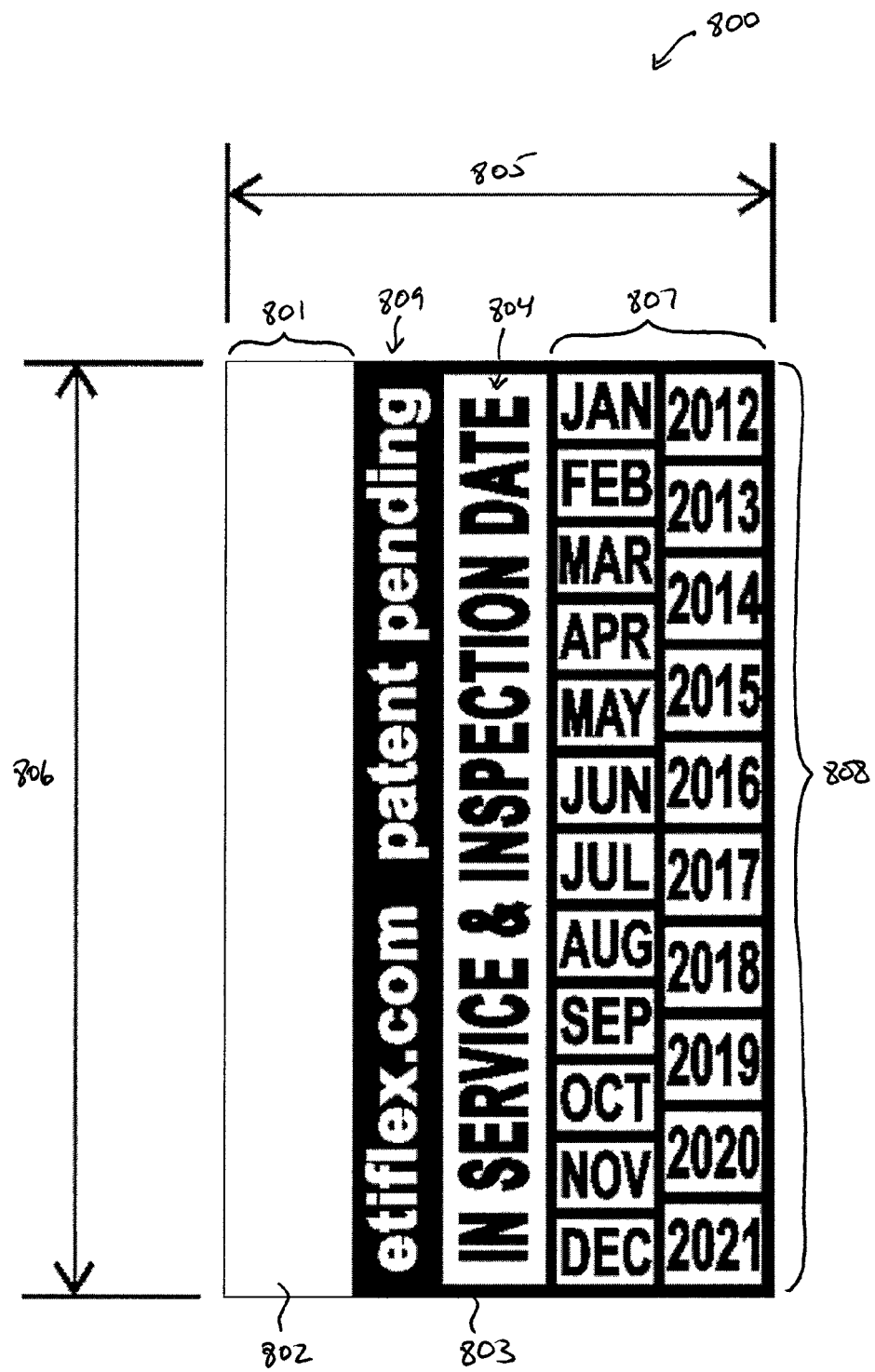
FIG. 18 shows an exemplary product identification tag with an in-service date and an inspection date as distinctive identification information.

With reference to FIG. 18, an exemplary product identification tag 800 is illustrated with an in-service date and/or inspection date as the indicia 803, i.e., the distinctive identification information to be captured for a specific product. The product information tag 800 can be manufactured substantially similarly to the previously discussed product identification tags and can include a background surface 802 and a useful information label 804. In some exemplary embodiments, the product information tag 800 can include a notice section 809 for displaying, e.g., a company name, miscellaneous and/or additional notes, a patent status, and the like. The product information tag 800 generally includes a plurality of rows 808 and columns 807 for capturing the distinctive identification information, e.g., the in-service date and/or inspection date, for a specific product. The plurality of rows 808 and columns 807 can be substantially similar to those of the product identification tag 200 discussed previously.

The exemplary product identification tag 800 of FIG. 18 generally includes an attachment section 801 adjacent to the notice section 809 for fixating the product identification tag 800 to a product and/or a material connected to the product, e.g., a webbing, and the like, in a manner substantially similar to that described with respect to the product identification tag 780 of FIG. 16. Thus, the "capturing" area, i.e., at least the plurality of rows 808 and columns 807, can generally remain unattached relative to the product such that distinctive identification information for the product can be captured after the product identification tag 800 has been attached to the product. In particular, the product identification tag 800 can be fixated to the product such that the "capturing" area acts as a flap or flag which can be lifted from the product surface to capture the distinctive identification information. Thus, a user can capture the distinctive identification information for a specific product in real-time.

In addition, the product identification tag 800 can be configured and dimensioned based on, e.g., the amount of indicia 803 to be included, the intended products to be used in conjunction with the product identification tag 800, the amount of visibility desired, and the like. For example, the product identification tag 800 can have a width 805 of about 1.02 inches and a length 806 of about 1.75 inches to provide sufficient visibility of the indicia 803 and sufficient space for a user to capture, e.g., pierce, punch out, and the like, the in-service date and/or inspection date for the specific product.

Figure 19:
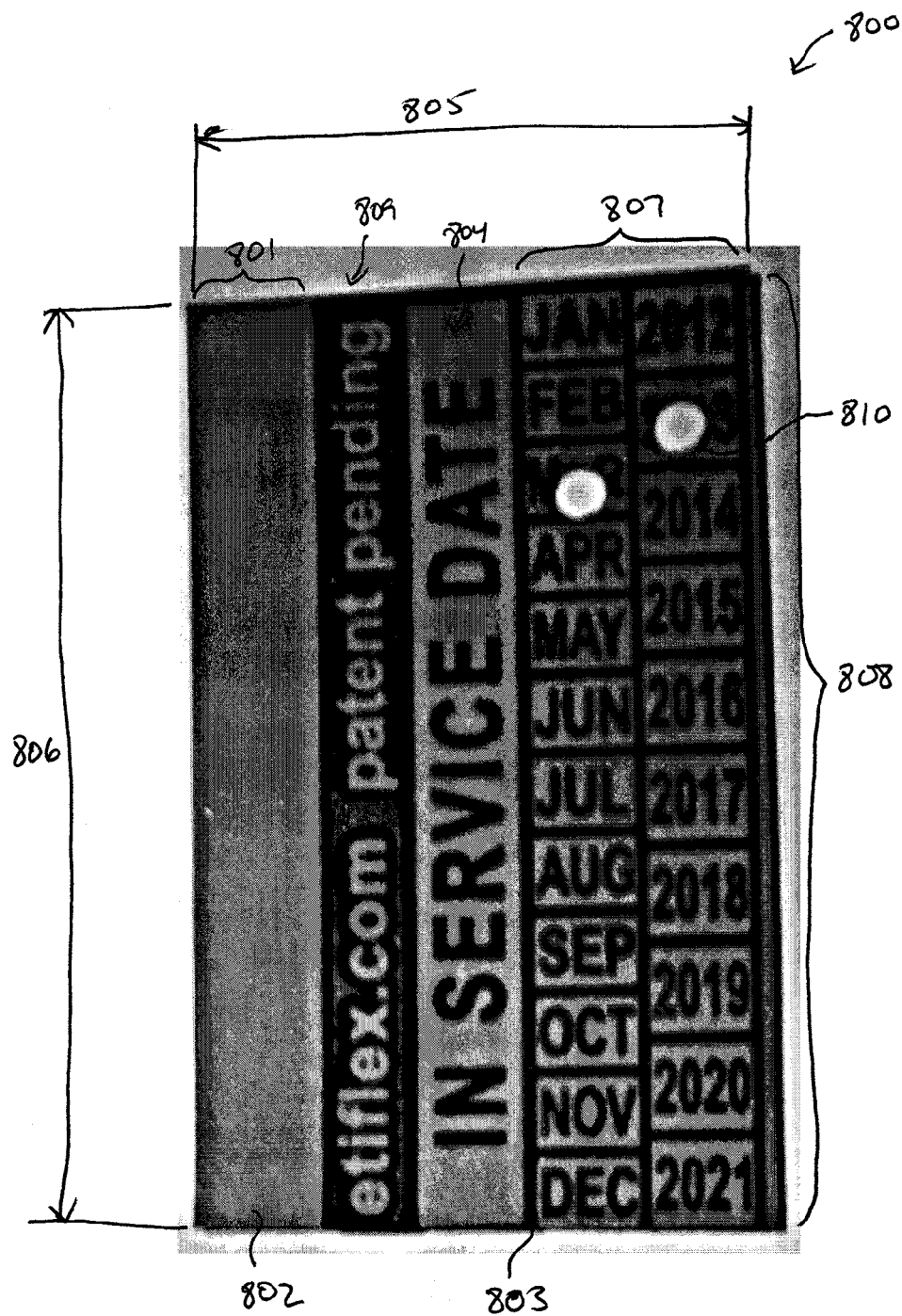
FIG. 19 shows an exemplary product identification tag with a captured in-service date as distinctive identification information.

With reference to FIG. 19, the exemplary product, identification tag 800 is depicted, including captured distinctive identification information for a specific product, i.e., an in-service date and/or inspection date. The in-service date and/or inspection date captured by punching out and/or piercing the corresponding month and year of the plurality of rows 808 and columns 807 of the product identification tag 800 can be perceived by the corresponding capture marks 810. In particular, the first column corresponds to the month of the in-service date and/or inspection date, i.e., March, and the second column corresponds to the year of the in-service date and/or inspection date, i.e., 2013. Thus, the distinctive in-service date and/or inspection date "March 2013" can be accurately captured and/or visualized on the product identification tag 800.

Figure 20:
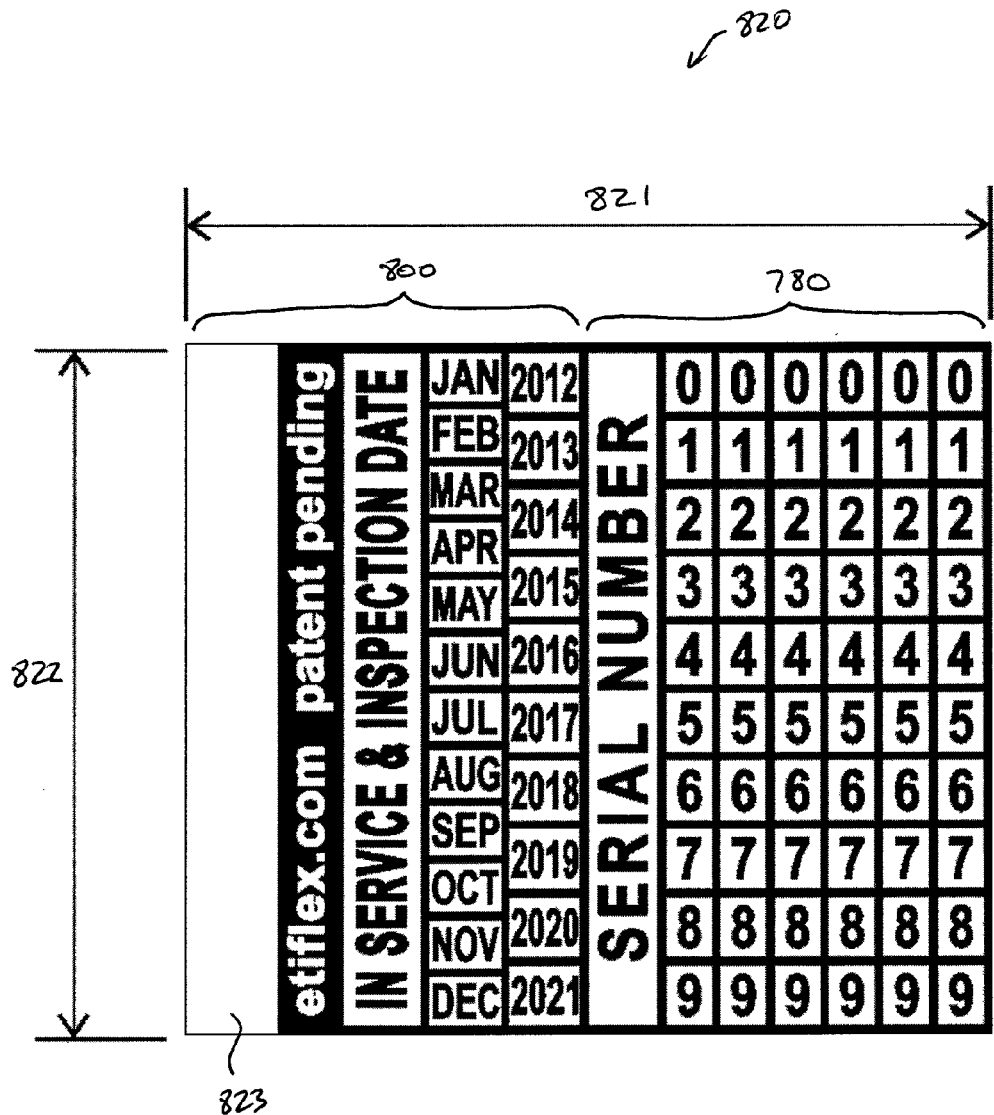
FIG. 20 shows an exemplary product identification tag with a serial number and an in-service date and inspection date as distinctive identification information.

Turning now to FIG. 20, an exemplary product identification tag 820 is depicted with a serial number and an in-service date/inspection date as the indicia 783 and 803 and/or the distinctive identification information to be captured for a specific product. In particular, the exemplary product identification tag 820 is a combination of the exemplary product identification tags 780 and 800 discussed above. Although combined with the product identification tag 800 to the left of the product identification tag 780, it should be understood that the product identification tags 780 and 800 can be combined in a variety of configurations. For example, the product identification tag 800 can be connected to, e.g., the left, right, top or bottom edge of the product identification tag 780. The product identification tag 820 generally also includes an attachment section 823 for attaching the product identification tag 820 to a product and/or a material connected to the product in a manner substantially similar to that described with respect to the product identification tag 780 of FIG. 16.

It should be further understood that the exemplary product identification tag 820 can include different types of indicia, e.g., a serial number, an in-service date, an inspection date, or the like. Due to the greater amount of indicia 783 and 803 included on the product identification tag 820, the dimensions, e.g., the width 821 and length 822 of the product identification tag 820, can be adjusted accordingly. Thus, the exemplary product identification tag 820 can have a width 821 of about 2.04 inches and a length 822 of about 1.75 inches.

Figure 21:
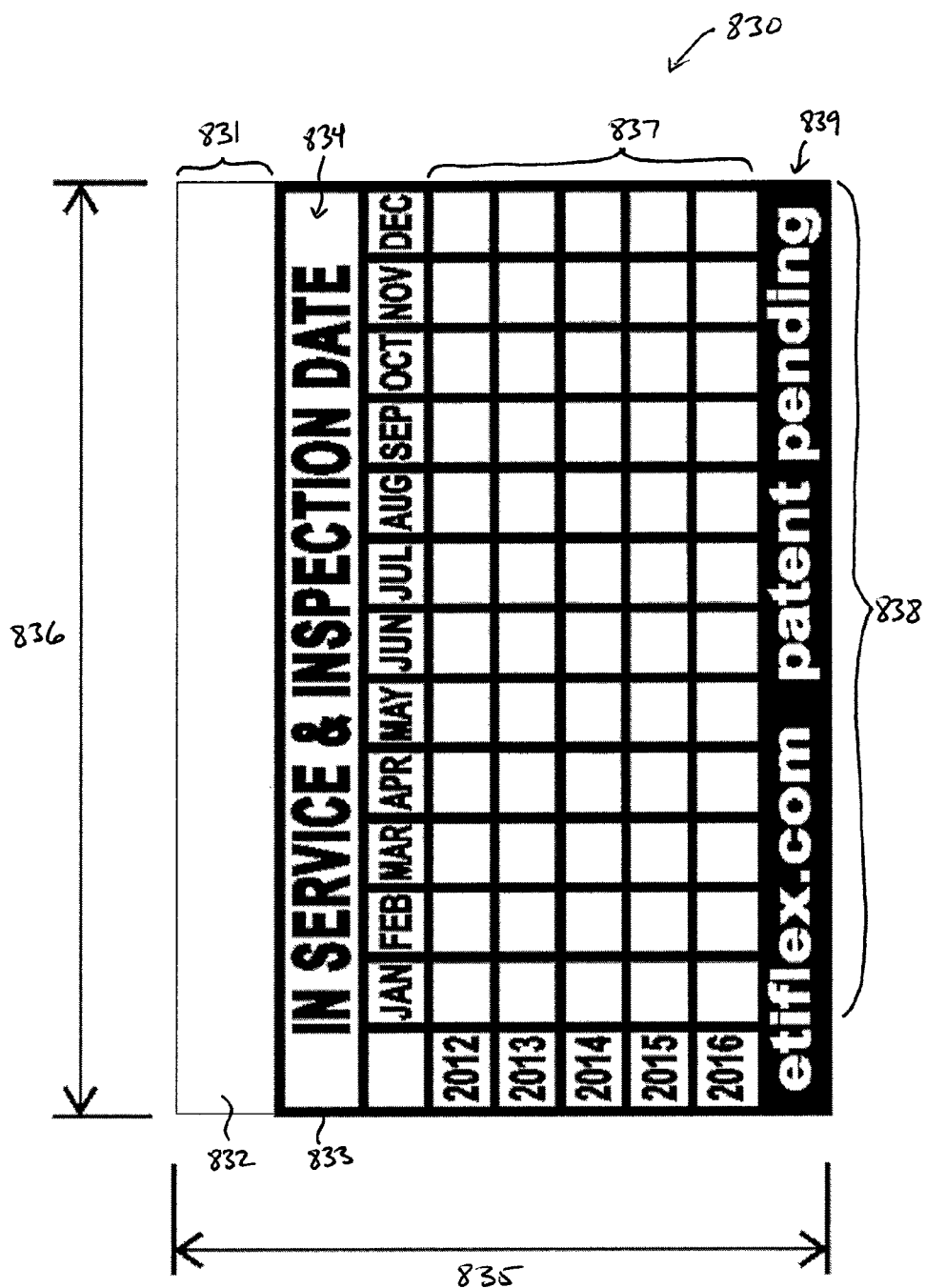
FIG. 21 shows an exemplary product identification tag with an in-service date and an inspection date as distinctive identification information.

Turning now to FIG. 21, an exemplary product identification tag 830 is illustrated with an in-service date and/or inspection date as the indicia 833, i.e., the distinctive identification information to be captured for a specific product. The product information tag 830 can be manufactured substantially similarly to the previously discussed product identification tags and can include a background surface 832 and a useful information label 834. In some exemplary embodiments, the product information tag 830 can include a notice section 839 for displaying, e.g., a company name, miscellaneous and/or additional notes, a patent status, and the like. The product information tag 830 generally includes a plurality of rows 838 and columns 837 for capturing the distinctive identification information, e.g., the in-service date and/or inspection date, for a specific product. The plurality of rows 838 and columns 837 can be substantially similar to those of the product identification tag 300 discussed previously.

The exemplary product identification tag 830 of FIG. 21 generally includes an attachment section 831 adjacent to either the notice section 839 or the useful information label 834 for fixating the product identification tag 830 to a product and/or a material connected to the product, e.g., a webbing, and the like, in a manner substantially similar to that described with respect to the product identification tag 780 of FIG. 16. Thus, the "capturing" area, i.e., at least the plurality of rows 838 and columns 837, can generally remain unattached relative to the product such that distinctive identification information for the product can be captured after the product identification tag 830 has been attached to the product. In particular, the product identification tag 830 can be fixated to the product such that the "capturing" area acts as a flap or flag which can be lifted from the product surface to capture the distinctive identification information. Thus, a user can capture the distinctive identification information for a specific product in real-time.

In addition, the product identification tag 830 can be configured and dimensioned based on, e.g., the amount of indicia 833 to be included, the intended products to be used in conjunction with the product identification tag 830, the amount of visibility desired, and the like. For example, the product identification tag 830 can have a width 835 of about 1.47 inches and a length 836 of about 1.97 inches to provide sufficient visibility of the indicia 833 and sufficient space for a user to capture, e.g., pierce, punch out, and the like, the in-service date and/or inspection date for the specific product.

Figure 22:
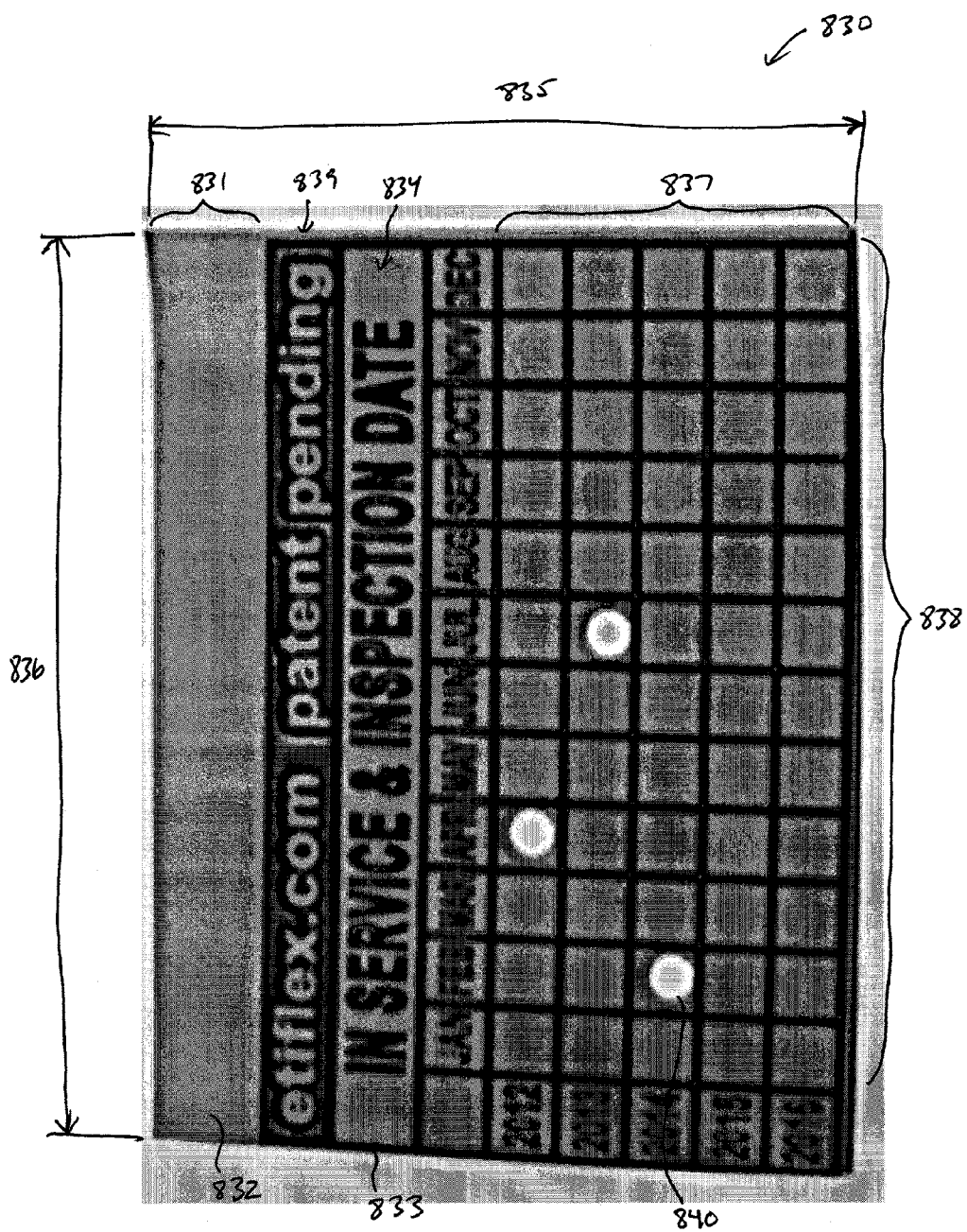
FIG. 22 shows an exemplary product identification tag with a captured in-service date and inspection date as distinctive identification information.

With reference to FIG. 22, the exemplary product identification tag 830 is depicted, including captured distinctive identification information for a specific product, i.e., an in-service date and/or inspection date. The in-service date and/or inspection date captured by punching out and/or piercing the corresponding month and year of the plurality of rows 838 and columns 837 of the product identification tag 830 can be perceived by the corresponding capture marks 840. As can be seen from FIG. 22, three dates have been captured. In particular, the first date, i.e., "April 2012", is captured by a corresponding capture mark 840 at the first column 837 and the fourth row 838, the second date, i.e., "July 2013", is captured by a corresponding capture mark 840 at the second column 837 and the seventh row 838, and the third date, i.e., "February 2014" is captured by a corresponding capture mark 840 at the third column 837 and the second row 838. Thus, the distinctive in-service dates and/or inspection dates can be accurately captured and/or visualized on the product identification tag 830.

Figure 23:
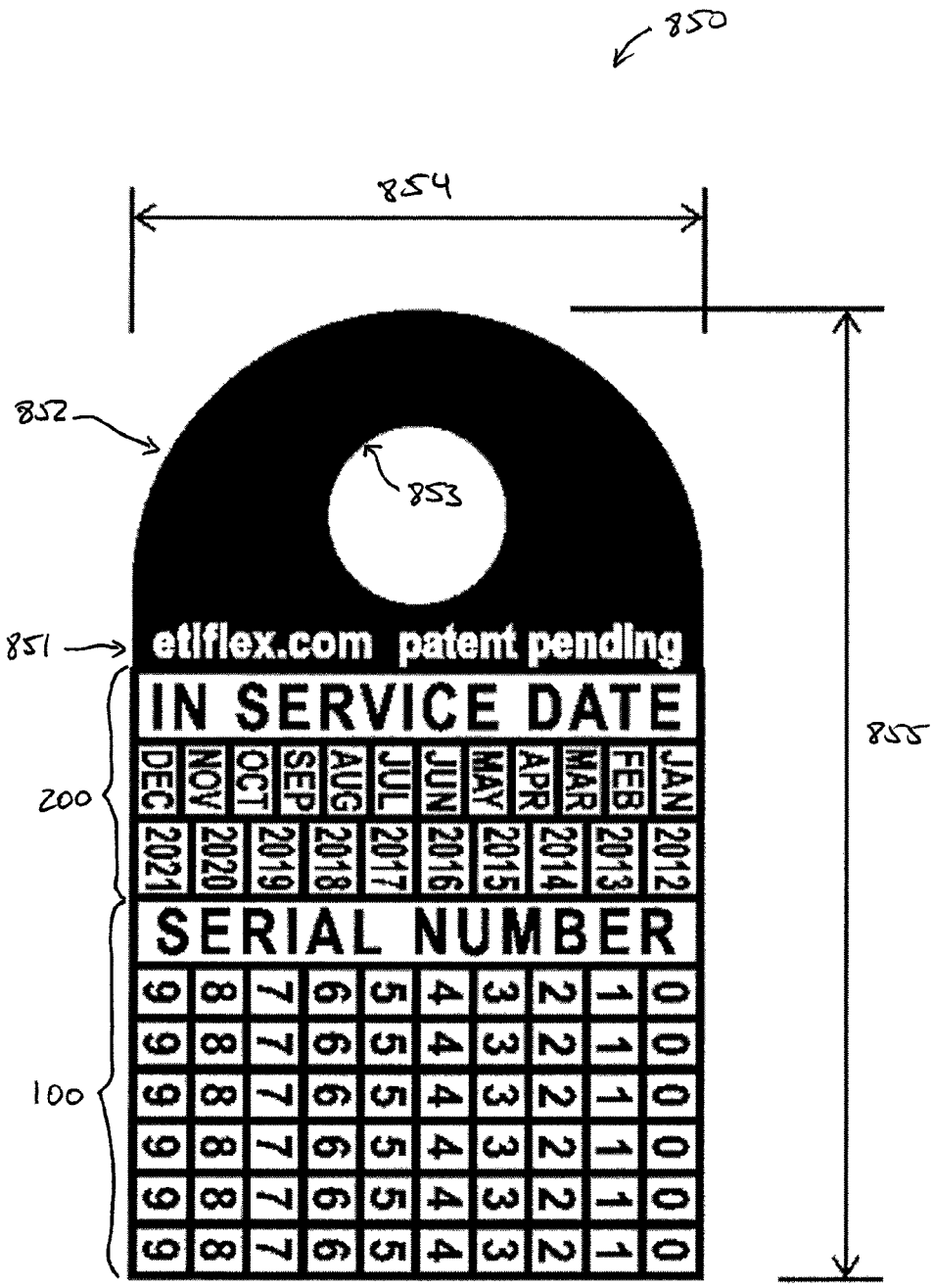
FIG. 23 shows an exemplary product identification tag with a serial number and an in-service date as distinctive identification information.

Turning now to FIG. 23, an exemplary product identification tag 850 is illustrated with a serial number and an in-service date as the indicia 103 and 203, i.e., the distinctive identification information to be captured for a specific product. The product information tag 850 can be manufactured substantially similarly to the previously discussed product identification tags. The exemplary product identification tag 850 can be a combination of the exemplary product identification tags 100 and 200 discussed above and an exemplary attachment means 852. The attachment means 852 can be, e.g., a protrusion with an aperture 853, for attachment to a product. In some exemplary embodiments, the aperture 853 can be implemented to, e.g., braid the product identification tag 850 into a rope (for example, a wire lanyard) connected to a product, attach to a product with a wire lanyard, attach to a product with grommets and a nylon tie, attached to a product with a rope, and the like. The product identification tag 850 may further include a notice section 851 for displaying, e.g., a company name, miscellaneous and/or additional notes, a patent status, and the like.

The dimensions of the exemplary product identification tag 850 can be a width 854 of about 1.53 inches and a length 855 of about 2.60 inches. However, it should be understood that the configurations and/or dimensions of the exemplary product identification tag 850 and the alternative exemplary tags discussed herein can be adjusted based on, e.g., the amount of indicia to be included, the intended products to be used in conjunction with the product identification tag 850, the amount of visibility desired, the final application of the product identification tag, and the like.

Figure 24:
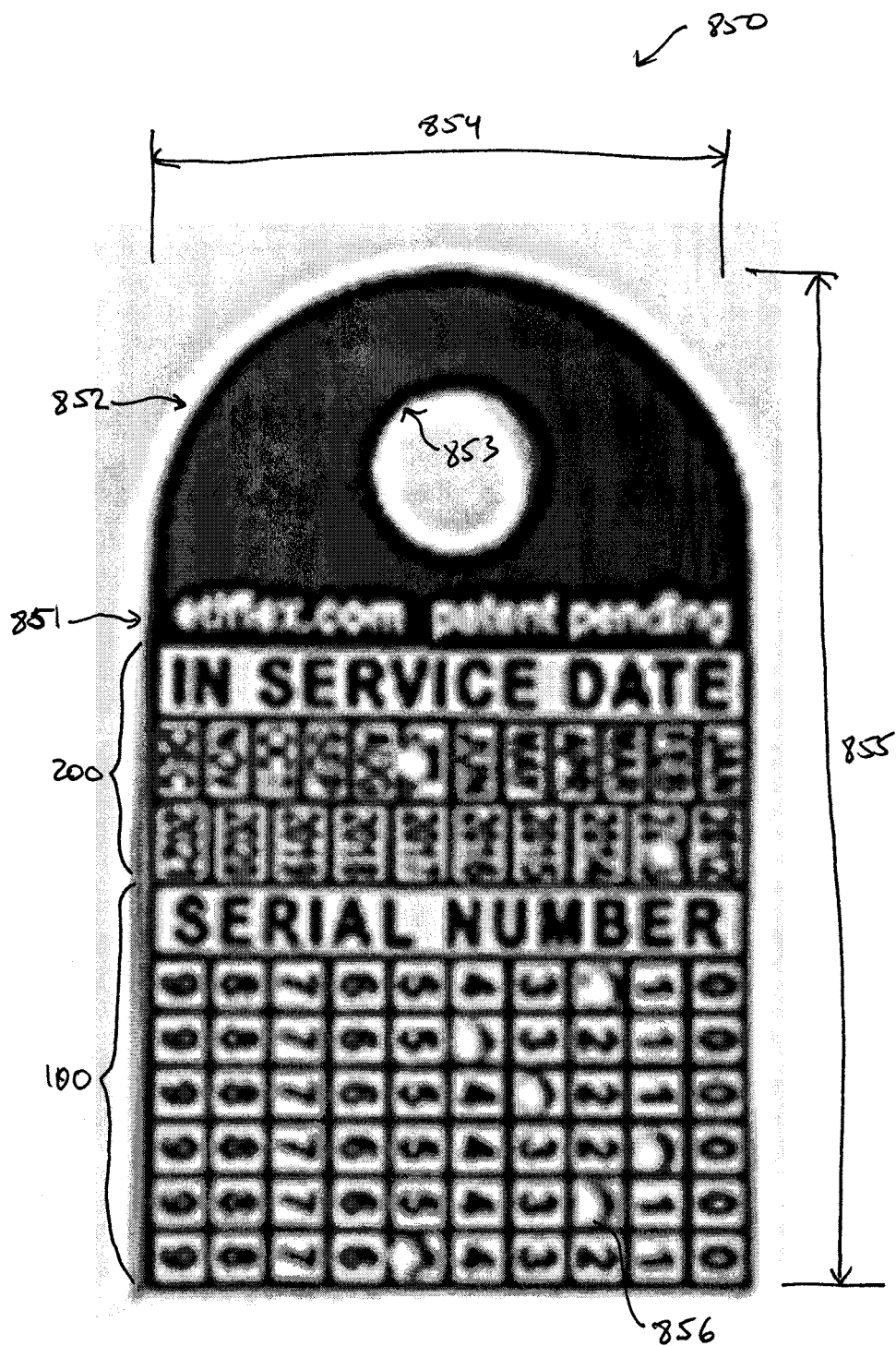
FIG. 24 shows an exemplary product identification tag with a captured serial number and in-service date as distinctive identification information.

With reference to FIG. 24, the exemplary product identification tag 850 is depicted, including captured distinctive identification information for a specific product, i.e., a serial number and an in-service date. The distinctive serial number and in-service date captured by punching out the corresponding digits, month and year of the plurality of columns and rows of the product identification tags 100 and 200 can be perceived by the corresponding capture marks 856. With respect to the product identification tag 100, the first column 107a corresponds to the first digit of the serial number, i.e., 2, the second column 107b corresponds to the second digit of the serial number, i.e., 4, the third column 107c corresponds to the third digit of the serial number, i.e., 3, the fourth column 107d corresponds to the fourth digit of the serial number, i.e., 1, the fifth column 107e corresponds to the fifth digit of the serial number, i.e., 2, and the sixth column 107f corresponds to the sixth digit of the serial number, i.e., 5. Similarly, with respect to the product identification tag 200, the first column 207a corresponds to the month, i.e., July, and the second column 207b corresponds to the year, i.e., 2013. Thus, the distinctive serial number "243125" and the in-service date "July 2013" can be accurately captured and/or visualized on the product identification tags 100 and 200.

Figure 25:
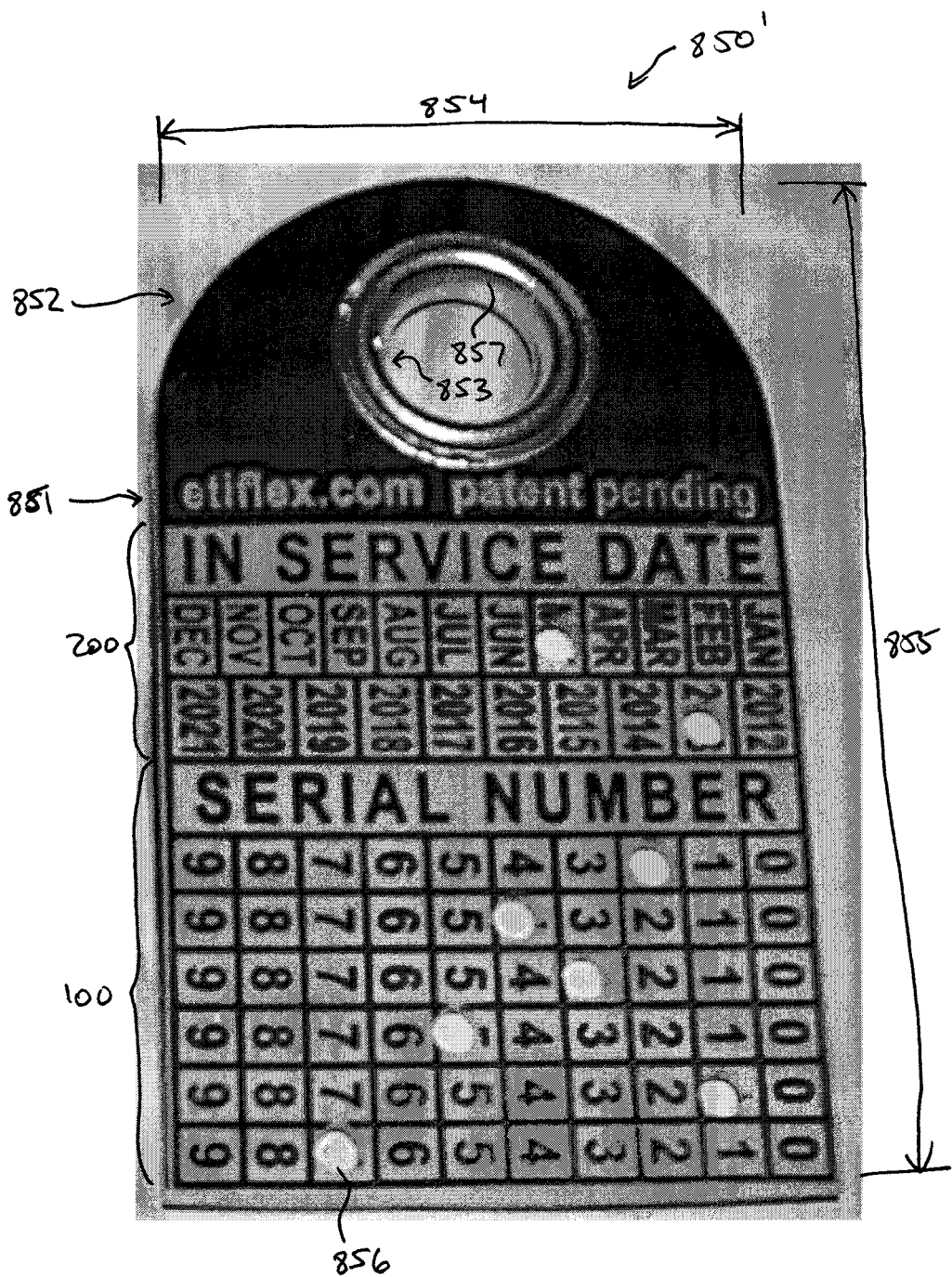
FIG. 25 shows an exemplary product identification tag with a captured serial number and in-service date as distinctive identification information.

With reference to FIG. 25, an exemplary product identification tag 850' is depicted. In particular, the product identification tag 850' can be substantially similar in configuration and function as the product identification tag 850 discussed above. In addition, the product identification tag 850' can include a grommet 857 positioned within the aperture 853. As would be understood by those of ordinary skill in the art, the grommet 857 may help in reducing wear and/or tearing of the attachment means 852. Similarly to the product identification tag 850, the distinctive serial number and in-service date, i.e., "243517" and "May 2013", captured by punching out the corresponding digits, month and year of the plurality of columns and rows of the product identification tags 100 and 200 can be perceived by the corresponding capture marks 856.

Figure 26:
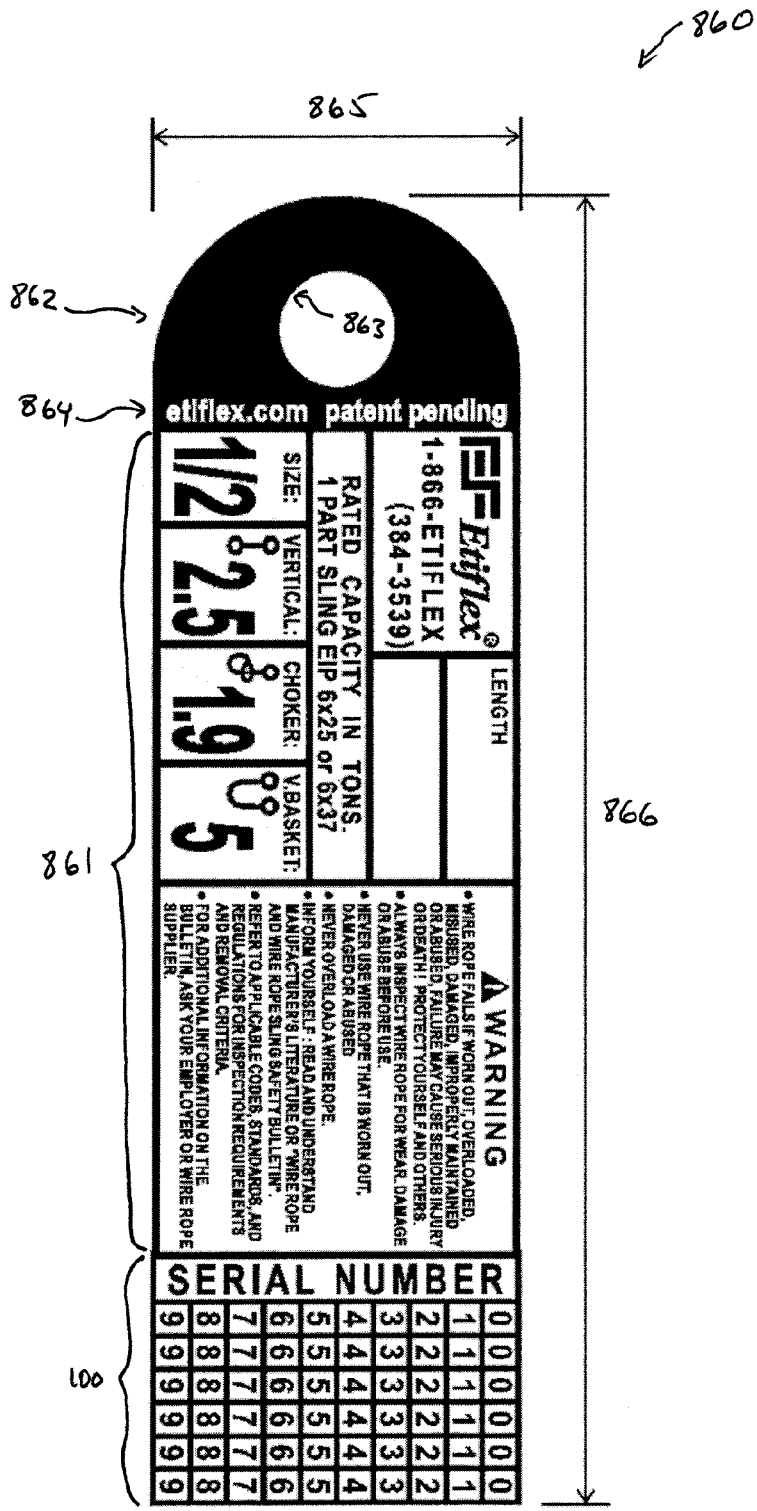
FIG. 26 shows an exemplary product identification tag with a serial number as distinctive identification information.

Turning now to FIG. 26, an exemplary product identification tag 860 is illustrated with a serial number as the indicia 103 and/or the distinctive identification information to be captured for a specific product. The exemplary product identification tag 860 can be a combination of the exemplary product identification tag 100 discussed above and an exemplary product information tag 861. Although combined with the product identification tag 100 at the top of the product information tag 861, it should be understood that the product identification tag 100 and the product information tag 861 can be combined in a variety of configurations. For example, the product identification tag 100 can be connected to, e.g., the left, right, top or bottom edge of the product information tag 861. It should be further understood that the exemplary product identification tag 860 can include different types of indicia, e.g., a serial number, an in-service date, an inspection date, a combination of indicia, or the like.

The product information tag 861 can be substantially similar to the product information tags discussed above and can include a plurality of useful information, e.g., a company logo, company contact information, a plurality of product dimensions, a product description, a product type, a manufacturing date, a serial number, miscellaneous and/or additional notes, a warning section, and the like. The product identification tag 860 may include a notice section 862 for displaying, e.g., a company name, miscellaneous and/or additional notes, a patent status, and the like. In some exemplary embodiments, the product identification tag 860 can include attachment means 862 which can be, e.g., a protrusion with an aperture 863, for attachment to a product. In some exemplary embodiments, the aperture 853 can be implemented to, e.g., braid the product identification tag 860 into a rope (for example, a wire lanyard) connected to a product, attach to a product with a wire lanyard, attach to a product with grommets and a nylon tie, attached to a product with a rope, and the like.

The dimensions of the exemplary product identification tag 860 can be a width 865 of about 1.53 inches and a length 866 of about 5.42 inches. However, it should be understood that the configurations and/or dimensions of the exemplary product identification tag 860 and the alternative exemplary tags discussed herein can be adjusted based on, e.g., the amount of indicia to be included, the intended products to be used in conjunction with the product identification tag 860, the amount of visibility desired, the final application of the product identification tag, and the like.

Figure 27:
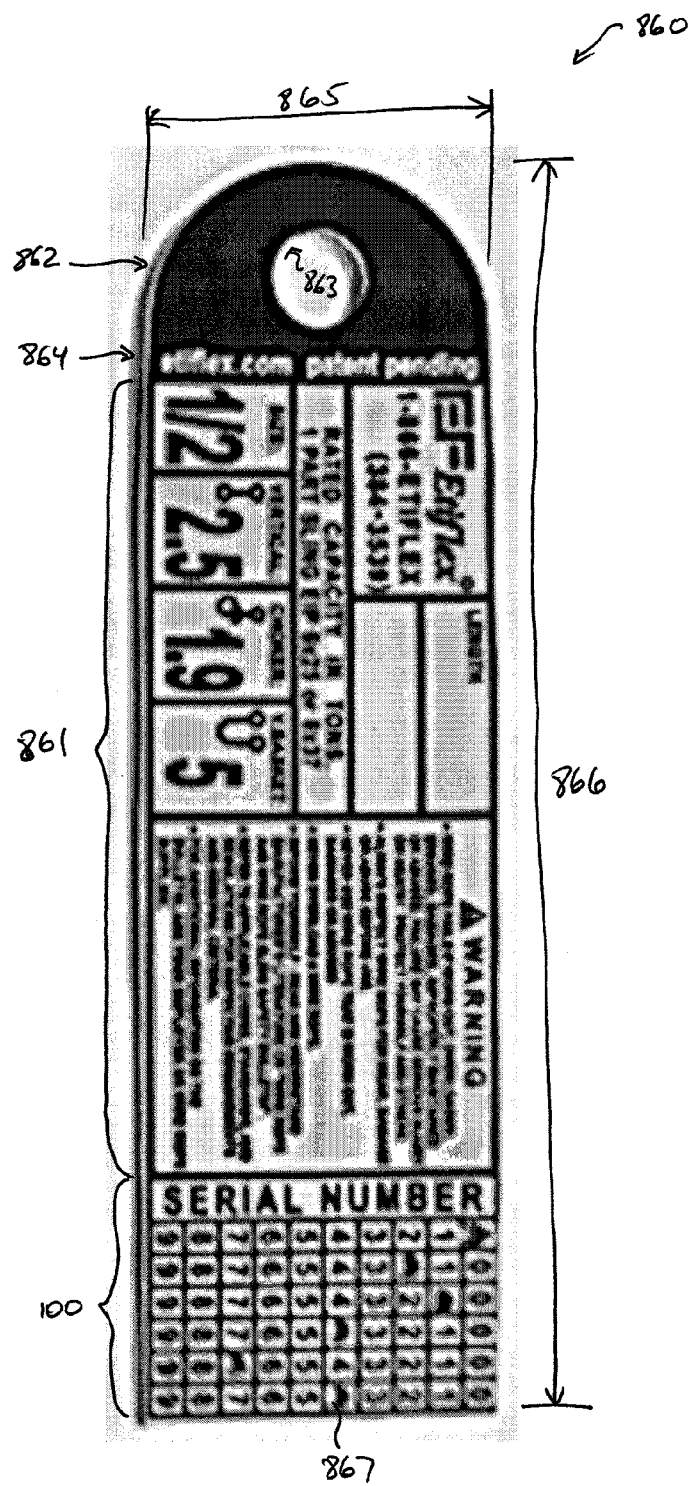
FIG. 27 shows an exemplary product identification tag with a captured serial number as distinctive identification information.

With reference to FIG. 27, the exemplary product identification tag 860 is depicted, including captured distinctive identification information for a specific product, i.e., a serial number. The distinctive serial number captured by punching out the corresponding digits of the plurality of columns and rows of the product identification tag 100 can be perceived by the corresponding capture marks 867. In particular, the first column 107a corresponds to the first digit of the serial number, i.e., 0, the second column 107b corresponds to the second digit of the serial number, i.e., 2, the third column 107c corresponds to the third digit of the serial number, i.e., 1, the fourth column 107d corresponds to the fourth digit of the serial number, i.e., 4, the fifth column 107e corresponds to the fifth digit of the serial number, i.e., 7, and the sixth column 107f corresponds to the sixth digit of the serial number, i.e., 4. Thus, the distinctive serial number "021474" can be accurately captured and/or visualized on the product identification tag 100.

Figure 28:
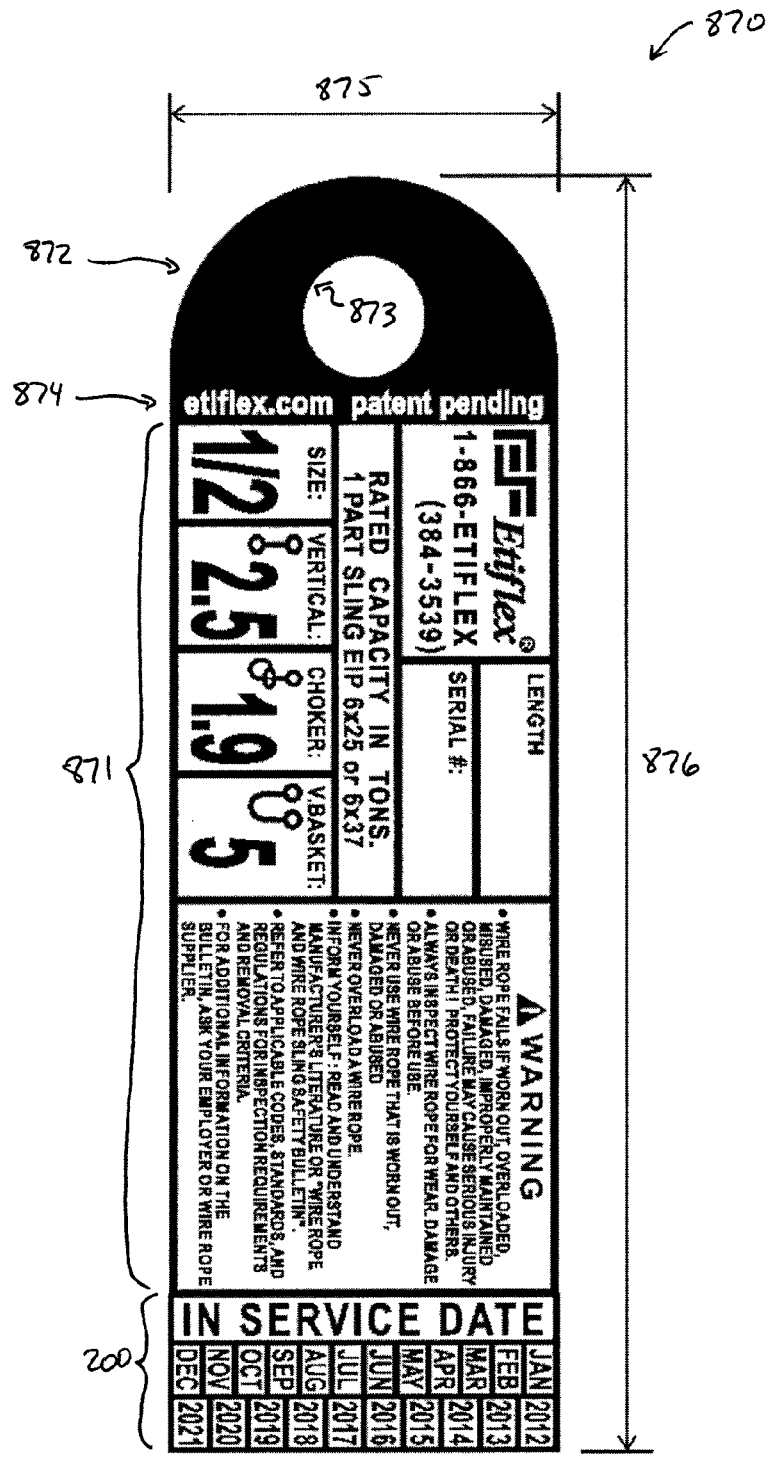
FIG. 28 shows an exemplary product identification tag with an in-service date as distinctive identification information.

Turning now to FIG. 28, an exemplary product identification tag 870 is illustrated with an in-service date as the indicia 203 and/or the distinctive identification information to be captured for a specific product. The exemplary product identification tag 870 can be a combination of the exemplary product identification tag 200 discussed above and an exemplary product information tag 871. The product information tag 871 can be substantially similar to the product information tag 861 discussed above. The product identification tag 870 may include a notice section 872 for displaying, e.g., a company name, miscellaneous and/or additional notes, a patent status, and the like. In some exemplary embodiments, the product identification tag 870 can include attachment means 872 with an aperture 873 substantially similar to the attachment means 862 discussed previously.

The dimensions of the exemplary product identification tag 870 can be a width 875 of about 1.53 inches and a length 876 of about 5.01 inches. However, it should be understood that the configurations and/or dimensions of the exemplary product identification tag 870 and the alternative exemplary tags discussed herein can be adjusted based on, e.g., the amount of indicia to be included, the intended products to be used in conjunction with the product identification tag 870, the amount of visibility desired, the final application of the product identification tag, and the like.

Figure 29:
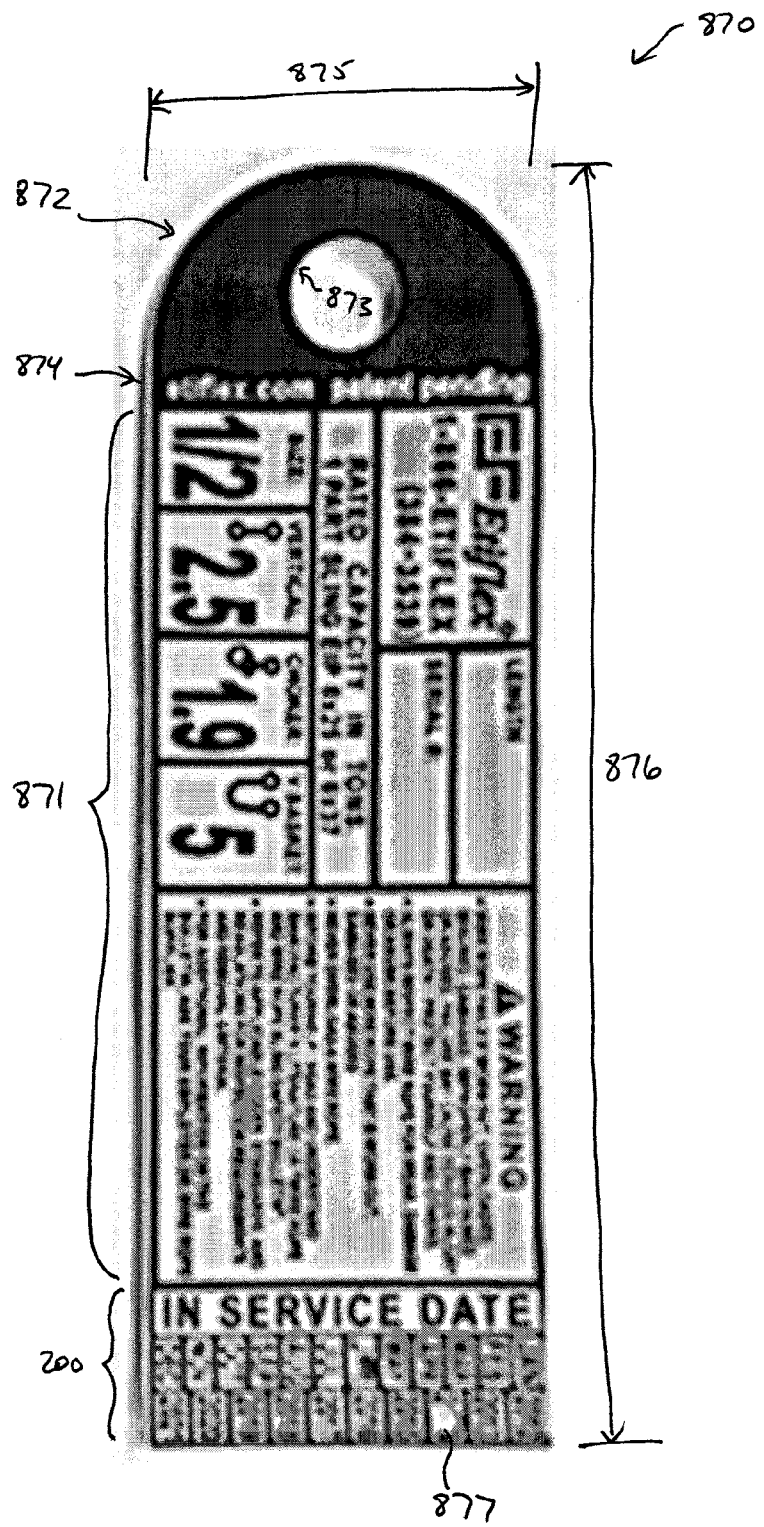
FIG. 29 shows an exemplary product identification tag with a captured in-service date as distinctive identification information.

With reference to FIG. 29, the exemplary product identification tag 870 is depicted, including captured distinctive identification information for a specific product, i.e., an in-service date. The in-service date captured by punching out the corresponding month and year of the plurality of columns and rows of the product identification tag 200 can be perceived by the corresponding capture marks 877. In particular, the first column 207a corresponds to the month, i.e., June, and the second column 207b corresponds to the year, i.e., 2014. Thus, the in-service date "June 2014" can be accurately captured and/or visualized on the product identification tag 200.

Figure 30:
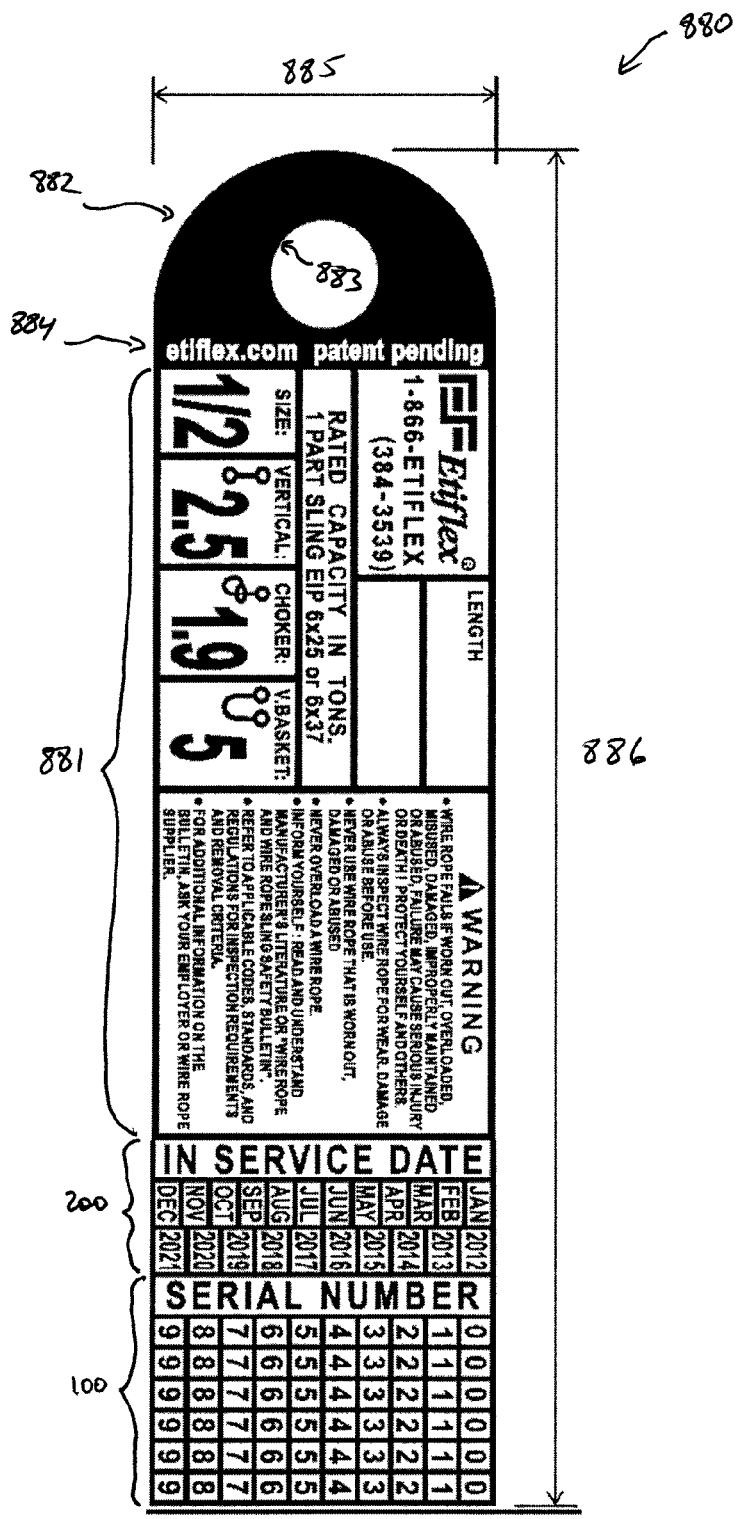
FIG. 30 shows an exemplary product identification tag with a serial number and an in-service date as distinctive identification information.

Turning now to FIG. 30, an exemplary product identification tag 880 is illustrated with a serial number and an in-service date as the indicia 103 and 203 and/or the distinctive identification information to be captured for a specific product. The exemplary product identification tag 880 can be a combination of the exemplary product identification tags 100 and 200 discussed above and an exemplary product information tag 881. The product information tag 881 can be substantially similar to the product information tag 861 discussed above. The product identification tag 880 may include a notice section 882 for displaying, e.g., a company name, miscellaneous and/or additional notes, a patent status, and the like. In some exemplary embodiments, the product identification tag 880 can include attachment means 882 with an aperture 883 substantially similar to the attachment means 862 discussed previously.

The dimensions of the exemplary product identification tag 880 can be a width 885 of about 1.53 inches and a length 886 of about 6.02 inches. However, it should be understood that the configurations and/or dimensions of the exemplary product identification tag 880 and the alternative exemplary tags discussed herein can be adjusted based on, e.g., the amount of indicia to be included, the intended products to be used in conjunction with the product identification tag 880, the amount of visibility desired, the final application of the product identification tag, and the like.

Figure 31:
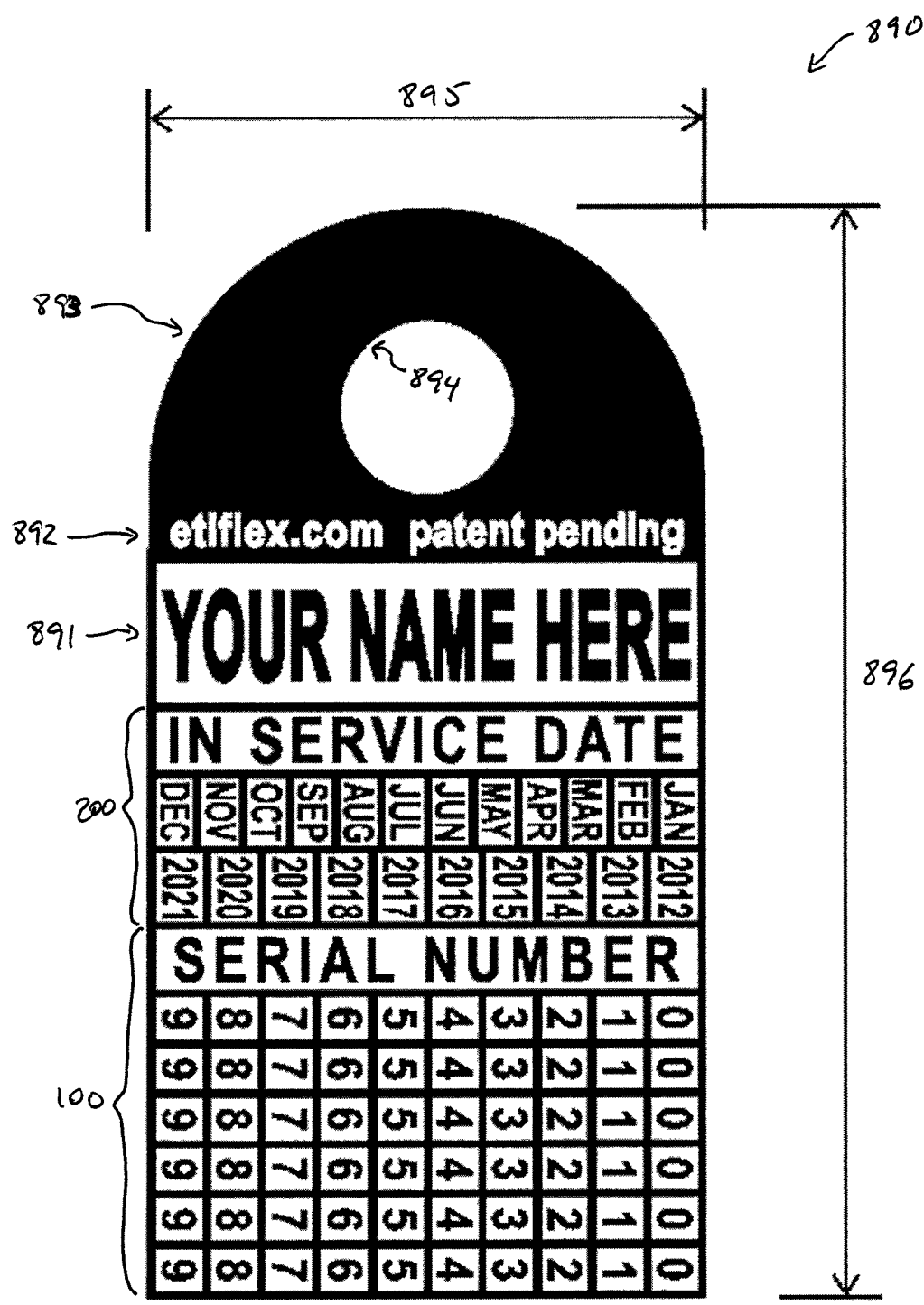
FIG. 31 shows an exemplary product identification tag with a serial number and an in-service date as distinctive identification information.

Turning now to FIG. 31, an exemplary product identification tag 890 is illustrated with a serial number and an in-service date as the indicia 103 and 203 and/or the distinctive identification information to be captured for a specific product. In particular, the exemplary product identification tag 890 can be a combination of the exemplary product identification tags 100 and 200 discussed above. The product identification tag 890 may include a label section 891 and a notice section 892 for displaying, e.g., a company name, miscellaneous and/or additional notes, a patent status, and the like. In some exemplary embodiments, the product identification tag 890 can include attachment means 893 with an aperture 894 substantially similar to the attachment means 862 discussed previously.

The dimensions of the exemplary product identification tag 890 can be a width 895 of about 1.53 inches and a length 896 of about 3.00 inches. However, it should be understood that the configurations and/or dimensions of the exemplary product identification tag 890 and the alternative exemplary tags discussed herein can be adjusted based on, e.g., the amount of indicia to be included, the intended products to be used in conjunction with the product identification tag 890, the amount of visibility desired, the final application of the product identification tag, and the like.

Figure 32:
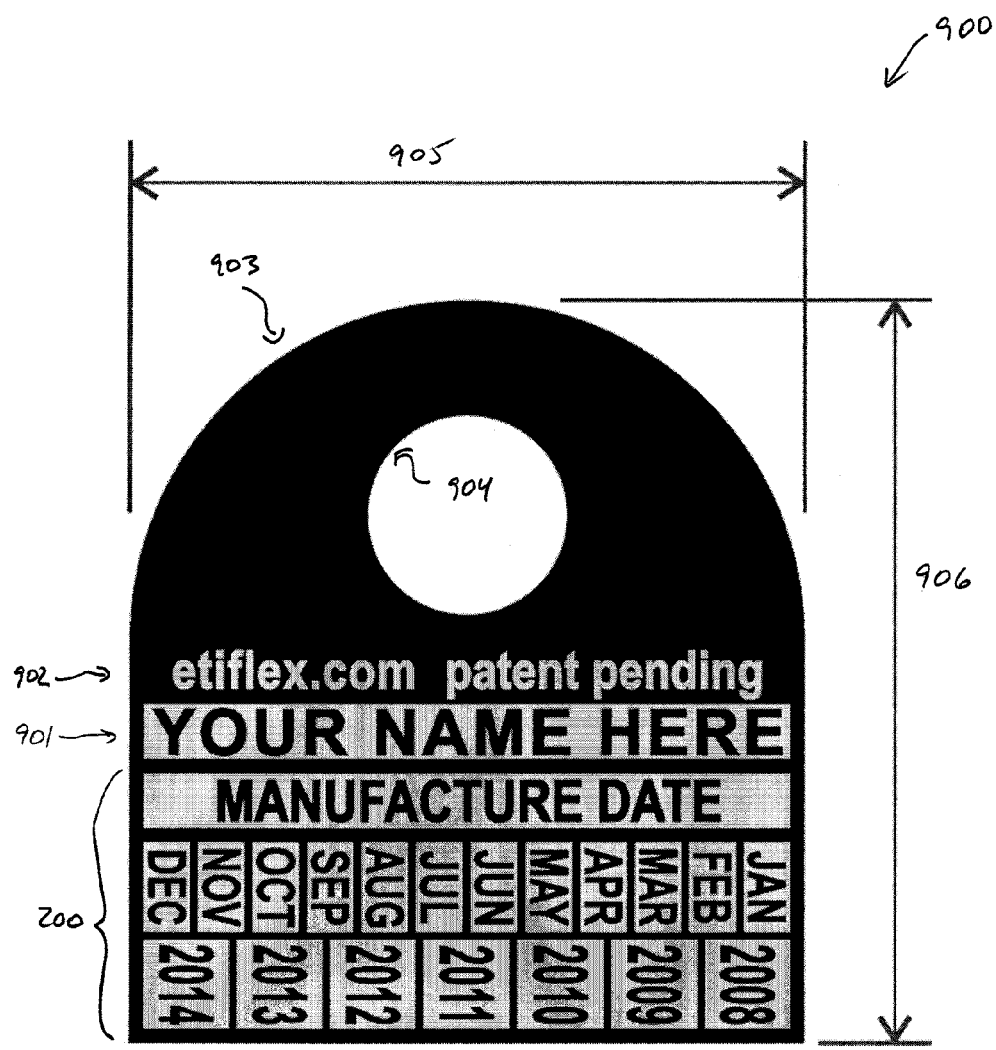
FIG. 32 shows an exemplary product identification tag with a manufacturing date as distinctive identification information.

With reference to FIG. 32, an exemplary product identification tag 900 is illustrated with a manufacturing date as the indicia 203 and/or the distinctive identification information to be captured for a specific product. In particular, the exemplary product identification tag 900 can be substantially similar to the exemplary product identification tag 200 discussed above for an in-service date. The product identification tag 900 may include a label section 901 and a notice section 902 for displaying, e.g., a company name, miscellaneous and/or additional notes, a patent status, and the like. In some exemplary embodiments, the product identification tag 900 can include attachment means 903 with an aperture 904 substantially similar to the attachment means 862 discussed previously.

The dimensions of the exemplary product identification tag 900 can be a width 905 of about 1.61 inches and a length 906 of about 1.77 inches. However, it should be understood that the configurations and/or dimensions of the exemplary product identification tag 900 and the alternative exemplary tags discussed herein can be adjusted based on, e.g., the amount of indicia to be included, the intended products to be used in conjunction with the product identification tag 900, the amount of visibility desired, the final application of the product identification tag, and the like.

Figure 33:
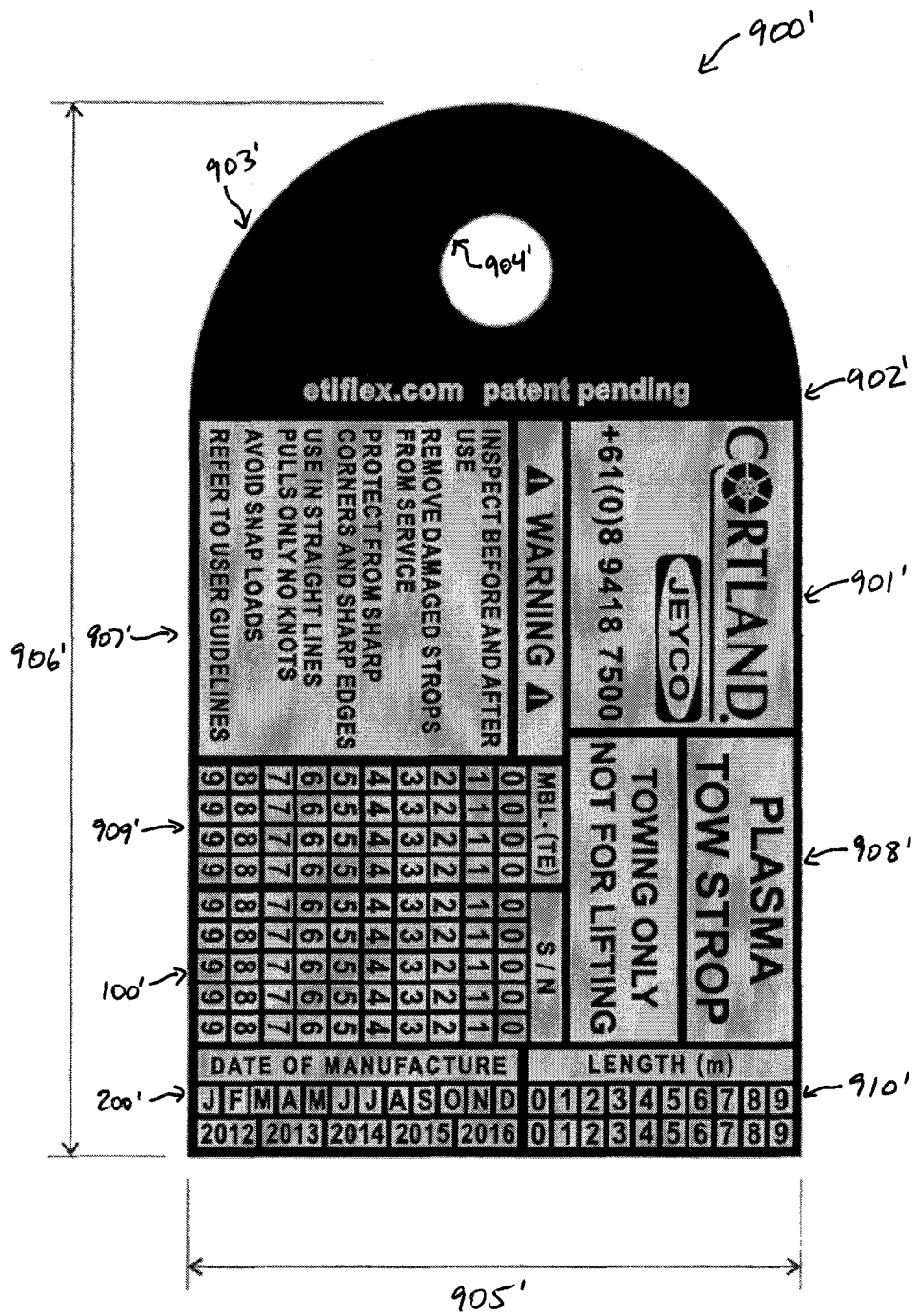
FIG. 33 shows an exemplary product identification tag with variable specification information as distinctive identification information.

With reference to FIG. 33, an exemplary product identification tag 900' is illustrated with variable specification information as the indicia 103 and/or the distinctive identification information to be captured for a specific product. In particular, the exemplary product identification tag 900' can be substantially similar to the exemplary product identification tags discussed previously. The product identification tag 900' may include a label section 901' and a notice section 902' for displaying, e.g., a company name, company contact information, miscellaneous and/or additional notes, a patent status, and the like. In some exemplary embodiments, the product identification tag 900' can include attachment means 903' and an aperture 904' substantially similar to the attachment means 862 discussed previously. The product identification tag 900' can include a matrix 100' substantially similar to the product identification tag 100 discussed previously for a serial number and a matrix 200' substantially similar to the product identification tag 200 discussed previously for a date of manufacture. The product identification tag 900' can include additional information sections 907' and 908' for displaying, e.g., warnings, instructions, additional information/labels, product restrictions, and the like. In some exemplary embodiments, the product identification tag 900' can include a plurality of variable specification information sections 909' and 910' for capturing variable product specification information. Thus, rather than identification or inspection data, the variable product specification information can include specifications by a manufacturer that are permanent and durable. As illustrated in FIG. 33, the variable specification information can include, e.g., a minimum breaking load (MBL) or strength of a product, a length, and the like. The variable specification information can be captured substantially similarly to the methods of capturing distinctive information described above, e.g., by piercing and/or punching the durable material at the corresponding indicia 103. In some exemplary embodiments, color coding of specific sections, indicia and/or the tag itself may be utilized to indicate, e.g., a particular year, hazard levels according to industry standards or codes, and the like.

The dimensions of the exemplary product identification tag 900' can be a width 905' of about 2.67 inches and a length 906' of about 4.72 inches. However, it should be understood that the configurations and/or dimensions of the exemplary product identification tag 900' and the alternative exemplary tags discussed herein can be adjusted based on, e.g., the amount of indicia to be included, the intended products to be used in conjunction with the product identification tag 900', the amount of visibility desired, the final application of the product identification tag 900', and the like.

Figure 34:
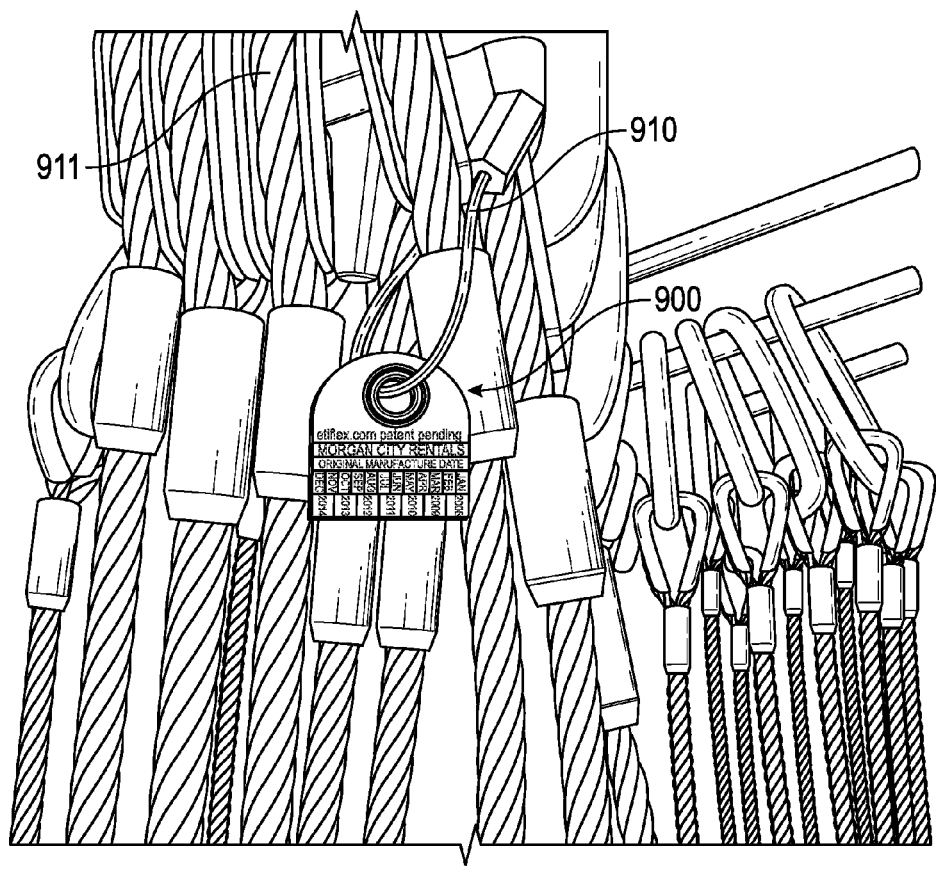
FIG. 34 shows an exemplary product identification tag with an original manufacturing date as distinctive identification information attached to a product.

Turning now to FIG. 34, the exemplary product identification tag 900 is depicted as attached to a wire rope or cable 911 of a product with wire lanyard 910. Although illustrated as attached with wire lanyard 910, in some exemplary embodiments, the product identification tag 900 may be attached to the wire rope or cable 911 with, e.g., wire, rope, nylon ties, and the like. The product identification tag 900 of FIG. 34 captures the original manufacturing date as the distinctive identification information. In particular, the original manufacturing date can be visualized as "July 2011".

Figure 35:
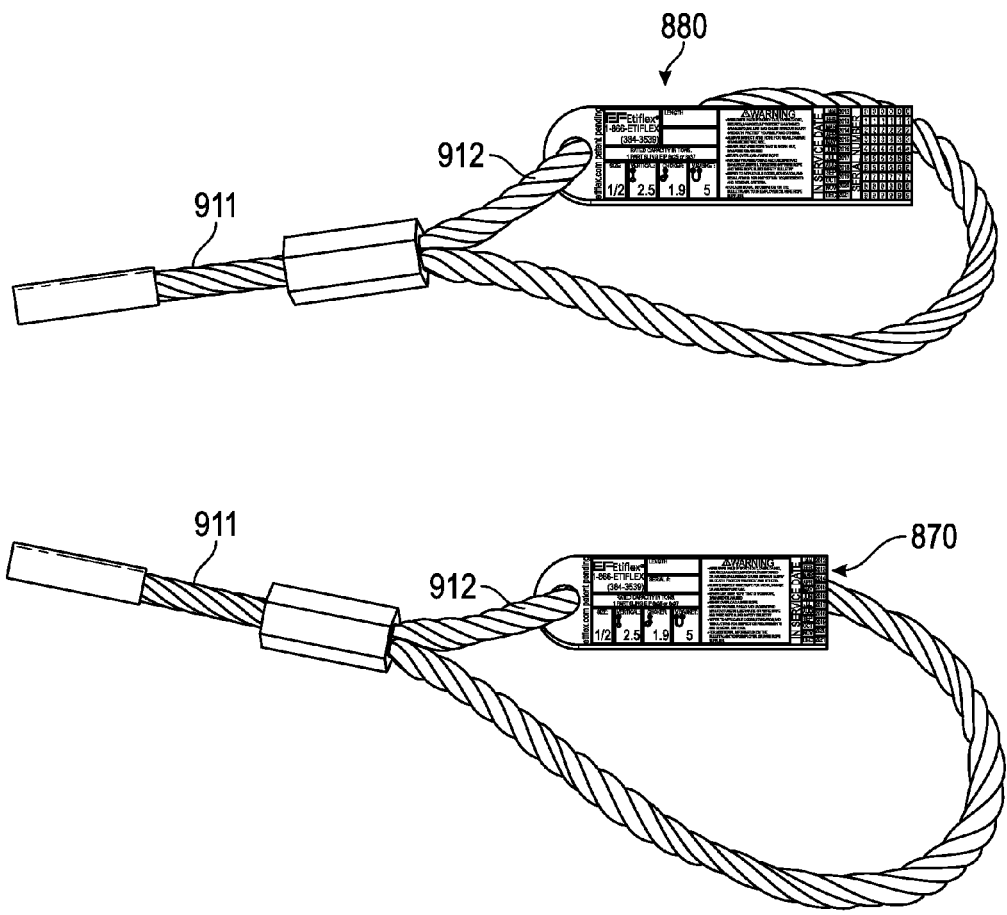
FIG. 35 shows exemplary product identification tags attached to a wire lanyard by braiding.
Figure 36A:
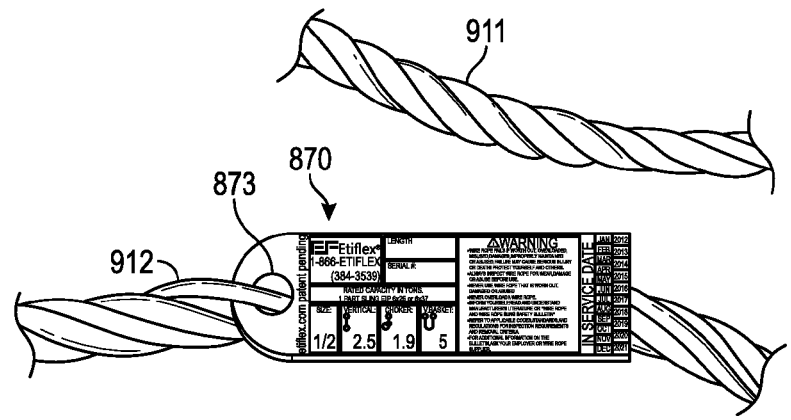
FIGS. 36A and 36B shows exemplary product identification tags attached to a wire lanyard by braiding.
Figure 36B:
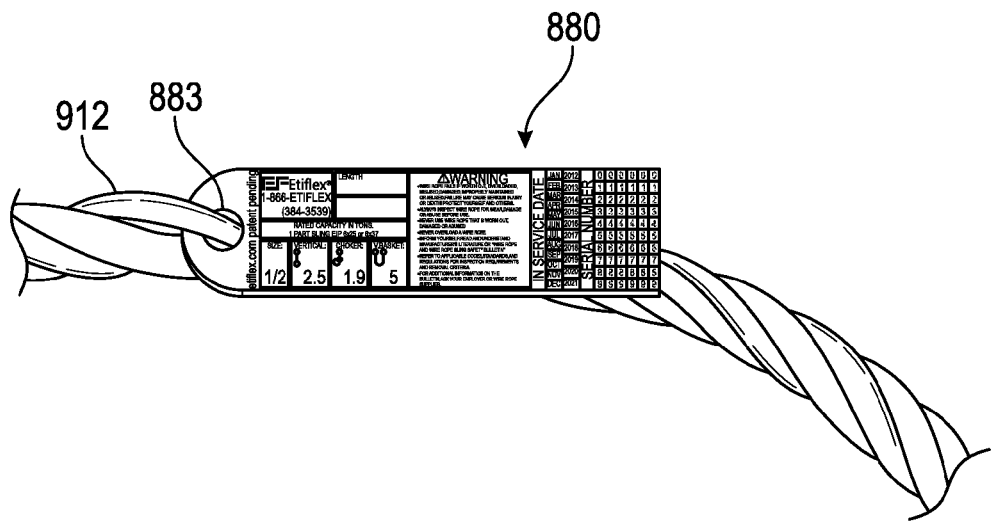
Figure 37:
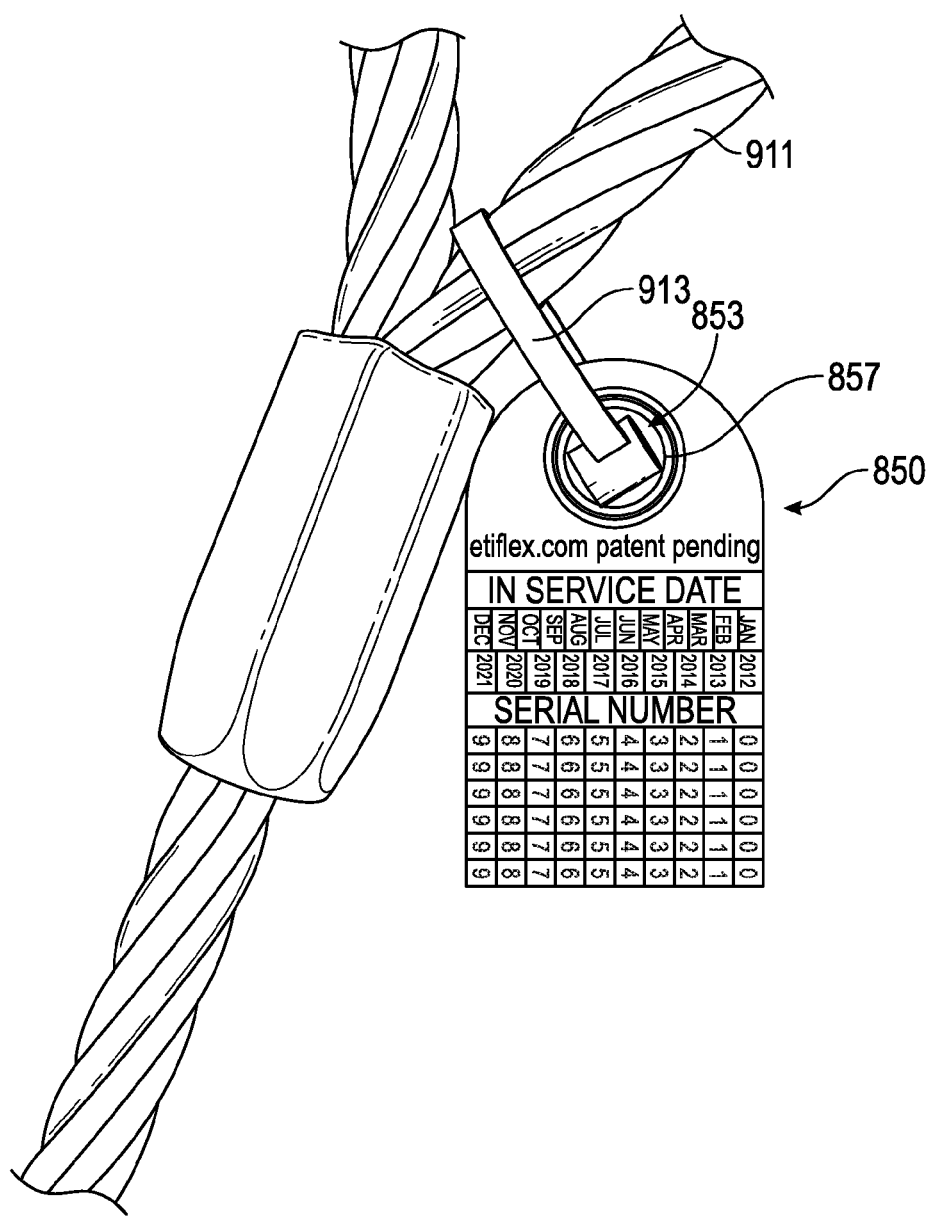
FIG. 37 shows an exemplary product identification tag attached to a wire lanyard.

FIG. 35 illustrates exemplary product identification tags 870 and 880 attached to wire rope or cable 911 by braiding. In particular, as would be understood by those of ordinary skill in the art, the wire rope or cable 911 can generally be manufacturing by intertwining a plurality of wire strands. The product identification tags 870 and 880 may be braided into the wire rope or cable 911 by passing one of the wire strands 912 through the aperture in the product identification tags 870 and 880 such that the product identification tags 870 and 880 remain fixated to the wire rope or cable 911. In some exemplary embodiments, the product identification tags 870 and 880 may be braided into, e.g., a rope, and the like. FIGS. 36A and 36B show detailed views of the braided attachment of the product identification tags 870 and 880 to the wire rope or cable 911. In particular, FIGS. 36A and 36B illustrate the individual wire strands 912 passing through the apertures 873 and 883 of the product identification tags 870 and 880, respectively. Similarly, FIG. 37 shows the exemplary product identification tag 850 attached to a wire rope or cable 911 by a nylon tie 913. In particular, the nylon tie 913 can be passed through the aperture 853 of the product identification tag 850 (with or without the grommet 957) and secured around the wire rope or cable 911. The wire rope or cable 911 can further be secured to a product.

Figure 38:
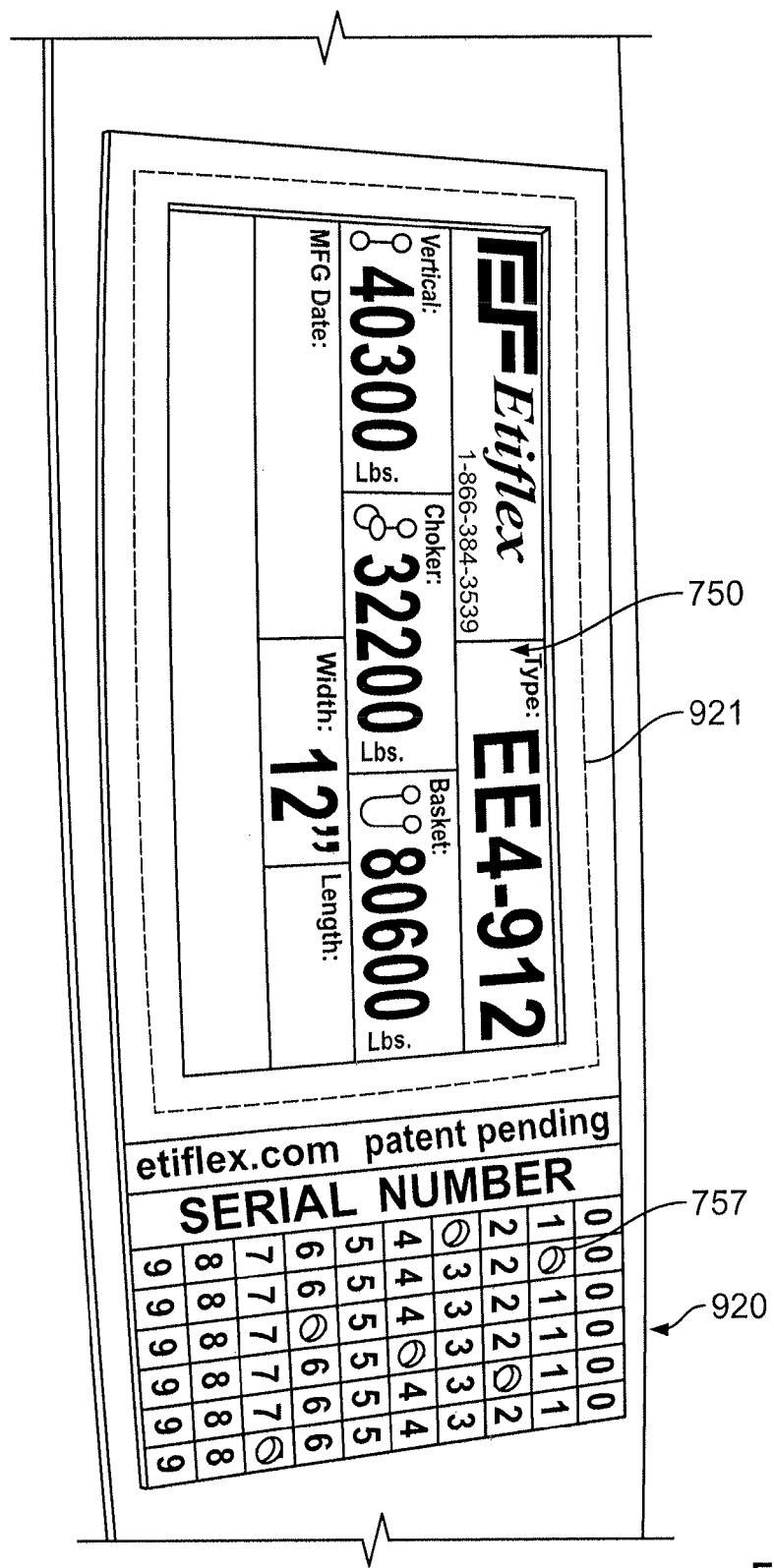
FIG. 38 shows an exemplary product identification tag attached to a product by stitching.
Figure 39A:
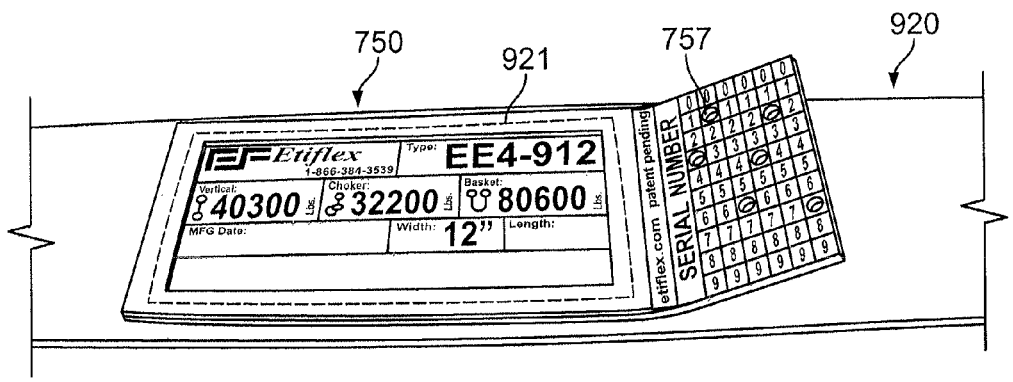
FIGS. 39A and 39B show exemplary product identification tags attached to a product by stitching.
Figure 39B:
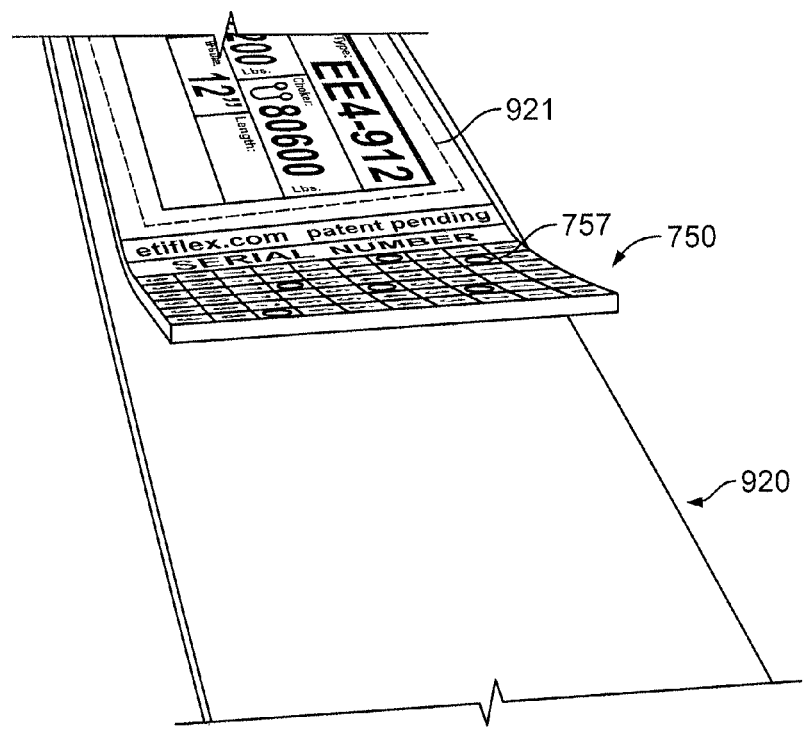

Turning now to FIGS. 38, 39A and 39B, the exemplary product identification tag 750 is depicted as attached to a product by stitching. The product identification tag 750 may be stitched to a product or a webbing 920 connected to a product with stitching 921 at the attachment border 753 discussed above. Thus, as can be seen from FIGS. 39A and 39B, the "capture" area may be lifted from the surface of the product or webbing 920 after the product identification tag 750 has been sewn to the product or webbing 920 such that the distinctive identification information may be captured in real-time. In particular, the "capture" area can be lifted such that both sides of the product identification tag 750 are accessible, thereby allowing a user to pierce and/or punch out the distinctive identification information. For example, the "capture" area of the product identification tag 750 has been lifted to capture the distinctive serial number, i.e., "316427". However, it should be understood that the distinctive identification information may be captured both prior to and after securing the product identification tag 750 to the product or webbing 920.

Figure 40:
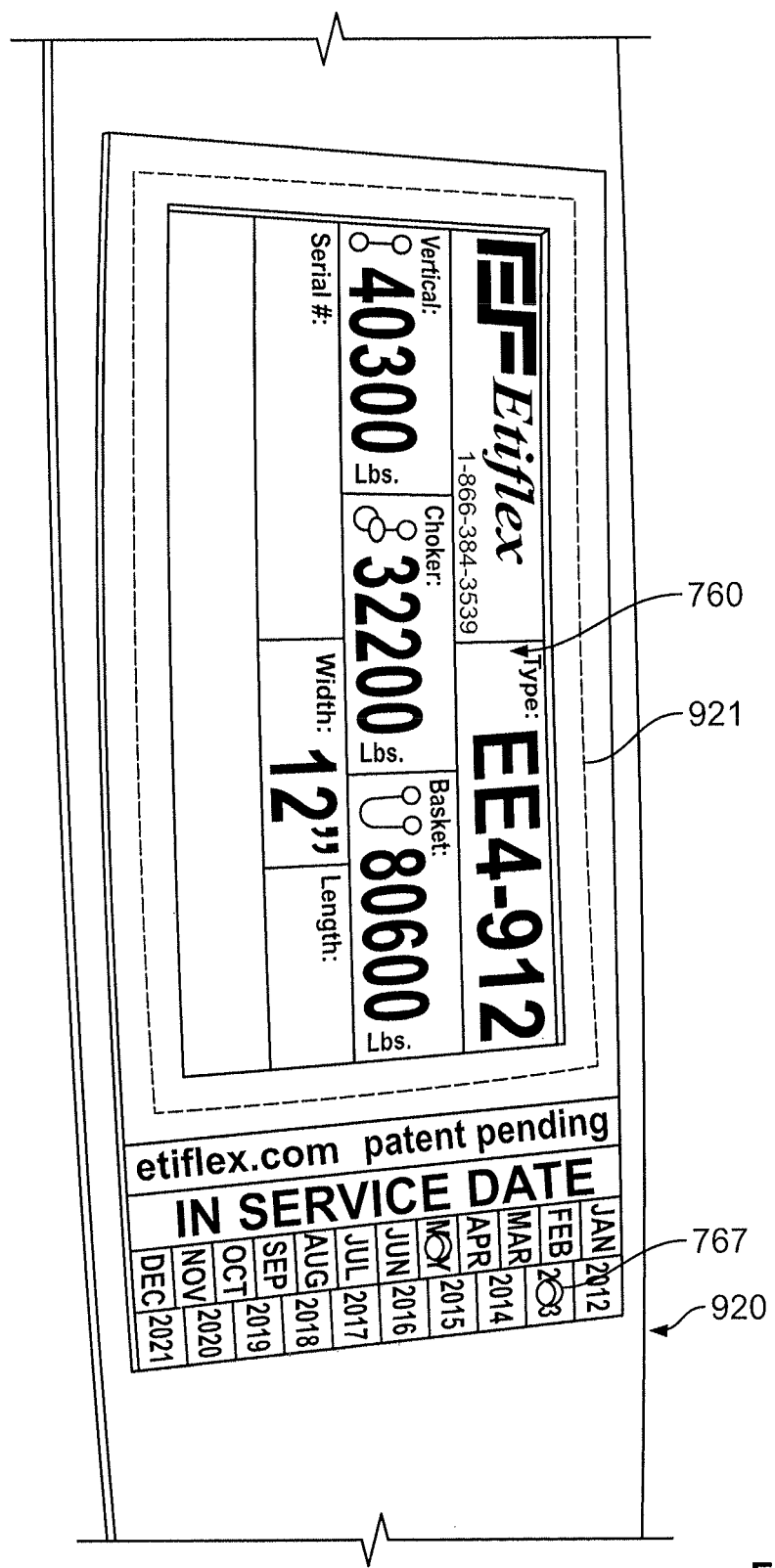
FIG. 40 shows an exemplary product identification tag attached to a product by stitching.
Figure 41:
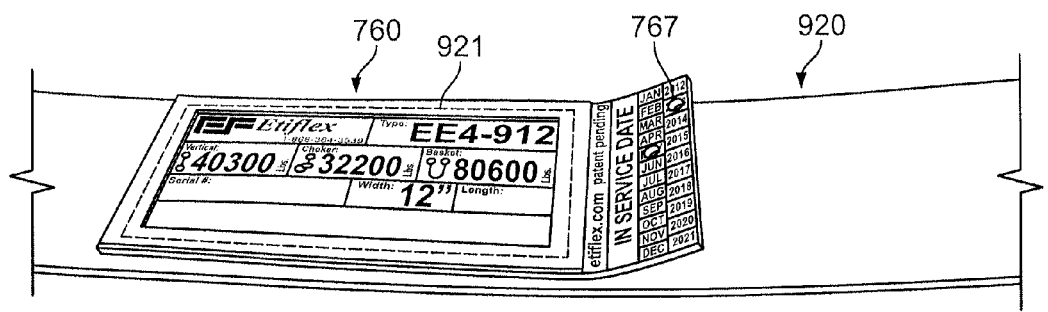
FIG. 41 shows an exemplary product identification tag attached to a product by stitching.

FIGS. 40 and 41 illustrate the exemplary product identification tag 760 as attached to a product by stitching. Similarly to the product identification tag 750, the product identification tag 760 may be stitched to a product or a webbing 920 connected to a product with stitching 921 at the attachment border 763 discussed previously. Thus, the "capture" area of the product identification tag 760 may be lifted to capture the in-service date, i.e., "May 2013", as shown in FIGS. 40 and 41.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A product identification tag, comprising:
   a tag element defining a front face and a rear face and fabricated at least in part from a durable material that is configured to be secured to a specific product such that the tag element is not adhered with respect to the specific product;
   wherein the tag element includes raised indicia protruding from the front face, the indicia being effective to (i) permit visual and physical perception of information conveyed thereby, and (ii) prevent a film of water from forming on the front face of the tag element, thereby improving readability of the raised indicia by preventing glare on the front face of the tag element;

wherein the durable material is configured to be at least one of pierced and punched through both the front face and the rear face to capture distinctive identification information for the specific product before the tag element is secured with respect to the specific product;

wherein the durable material is configured to be at least one of pierced and punched through both the front face and the rear face to capture distinctive identification information for the specific product after the tag element is secured with respect to the specific product; and wherein both the front face and the rear face are directly exposed to the environment and not encased within any ancillary element after the tag element is secured with respect to a specific product.

2. The product identification tag of claim 1, wherein the tag element is fabricated at least in part from one of a flexible material and a rigid material.

3. The product identification tag of claim 2, wherein the durable material is fabricated from at least one of a rubber, a plasticized PVC, a polymer, a silicone, and a thermoplastic compound.

4. The product identification tag of claim 3, wherein the durable material is reinforced with a fabric.

5. The product identification tag of claim 1, wherein the tag element is fabricated by at least one of injection molded, open molded, RF welded and thermoformed.

6. The product identification tag of claim 1, wherein the indicia is arranged in a plurality of rows and columns corresponding to the distinctive identification information.

7. The product identification tag of claim 1, wherein the distinctive identification information is at least one of a serial number, an in-service date, an inspection date, a manufacturing date, and specification information.

8. The product identification tag of claim 1, wherein the tag element is configured to be secured to the specific product with at least one of stitching, RF welding, a tie, a wire lanyard, a rope, a mechanical fastener, an adhesive, and a hook and loop system.

9. The product identification tag of claim 1, wherein the durable material is adapted to endure hazardous conditions.

10. The product identification tag of claim 1, wherein the raised indicia is further effective to guide a tool used to pierce or punch the durable material to a desired location.

11. The product identification tag of claim 1, wherein the raised indicia includes a texturized finish.

12. A method of product identification, comprising:

providing a tag element fabricated at least in part from a durable material, the tag element including raised indicia protruding from a front face of the tag element, the raised indicia being effective to (i) permit visual and physical perception of information conveyed thereby, and (ii) prevent a film of water from forming on the front face of the tag element, thereby improving readability of the raised indicia by preventing glare on the front face of the tag element;

securing the tag element to a specific product such that the tag element is not adhered with respect to the specific product and such that the tag element is directly exposed to the environment and is not encased within any ancillary element; and applying distinctive identification information to the tag element after the tag element is secured to the specific product;

wherein application of the distinctive identification information to the tag element is effectuated by at least one of piercing and punching the durable material through a front face and a rear face of the tag element to capture the distinctive identification information for the specific product on the tag element.

13. The method of claim 12, wherein the tag element is secured to the specific product using at least one of stitching, RF welding, a tie, a wire lanyard, and a rope.

14. The method of claim 12, wherein the durable material includes at least one of a flexible material and a rigid material.

15. The method of claim 14, wherein the durable material includes at least one of a rubber, a plasticized PVC, a polymer, a silicone, and a thermoplastic compound.

16. The method of claim 15, wherein the durable material is reinforced with fabric.

17. The method of claim 12, wherein the tag element is at least one of injection molded, open molded, RF welded and thermoformed.

18. The method of claim 12, wherein the distinctive identification information is applied in a plurality of rows and columns so as to convey the distinctive identification information with respect to the specific product.

19. The method of claim 12, wherein the distinctive identification information includes at least one of a serial number, an in-service date, an inspection date, a manufacturing date, and specification information.

20. The method of claim 12, wherein the durable material is adapted to endure hazardous conditions.

* * * * *